(12) United States Patent
Shimizu et al.

(10) Patent No.: US 9,087,533 B2
(45) Date of Patent: Jul. 21, 2015

(54) MAGNETIC HEAD, MAGNETIC HEAD ASSEMBLY, AND MAGNETIC RECORDING/REPRODUCTION APPARATUS

(71) Applicant: KABUSHIKI KAISHA TOSHIBA, Tokyo (JP)

(72) Inventors: Mariko Shimizu, Kawasaki (JP); Katsuhiko Koui, Yokohama (JP); Shuichi Murakami, Tokyo (JP); Hiromi Yuasa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/569,356

(22) Filed: Dec. 12, 2014

(65) Prior Publication Data

US 2015/0162032 A1     Jun. 11, 2015

Related U.S. Application Data

(60) Division of application No. 14/101,206, filed on Dec. 9, 2013, now Pat. No. 8,953,283, which is a continuation-in-part of application No. 13/777,933, filed on Feb. 26, 2013, now abandoned.

(30) Foreign Application Priority Data

Nov. 29, 2012   (JP) .................................. 2012-260832
Nov. 13, 2013   (JP) .................................. 2013-234725

(51) Int. Cl.
   *G11B 5/35*   (2006.01)
(52) U.S. Cl.
   CPC ........................................ *G11B 5/35* (2013.01)

(58) Field of Classification Search
   CPC .............................. G11B 5/1278; G11B 5/314
   USPC ......................................................... 360/234.3
   See application file for complete search history.

(56) References Cited

U.S. PATENT DOCUMENTS

| | | | |
|---|---|---|---|
| 7,933,146 | B2 | 4/2011 | Dimitrov et al. |
| 7,957,098 | B2 | 6/2011 | Yamada et al. |

(Continued)

FOREIGN PATENT DOCUMENTS

| | | |
|---|---|---|
| JP | 2008-277586 A | 11/2008 |
| JP | 2009-277704 A | 11/2009 |

(Continued)

OTHER PUBLICATIONS

U.S. Appl. No. 13/777,933, filed Feb. 26, 2013, Shimizu et al.

(Continued)

*Primary Examiner* — Angel Castro
(74) *Attorney, Agent, or Firm* — Knobbe, Martens, Olson & Bear, LLP

(57) ABSTRACT

According to one embodiment, a magnetic head includes a spin torque oscillator formed between a main magnetic pole and auxiliary magnetic pole. The spin torque oscillator includes a transmission-type spin transfer layer, first interlayer, oscillation layer, second interlayer, and reflection-type spin transfer layer. The transmission-type spin transfer layer includes a first perpendicular magnetization film and first interface magnetic layer. The first interface magnetic layer contains at least one element selected from Fe, Co, and Ni, and at least one element selected from Cr, V, Mn, Ti, and Sc. The reflection-type spin transfer layer includes a second perpendicular magnetization film.

8 Claims, 14 Drawing Sheets

(56) References Cited

U.S. PATENT DOCUMENTS

| | | |
|---|---|---|
| 7,982,996 B2 | 7/2011 | Smith et al. |
| 8,064,244 B2 | 11/2011 | Zhang et al. |
| 8,072,800 B2 | 12/2011 | Chen et al. |
| 8,098,514 B2 | 1/2012 | Nagase et al. |
| 8,164,854 B2 | 4/2012 | Takagishi et al. |
| 8,264,799 B2 | 9/2012 | Akiyama et al. |
| 8,274,811 B2 | 9/2012 | Zhang et al. |
| 8,472,140 B2 | 6/2013 | Yamada et al. |
| 8,564,904 B2 | 10/2013 | Iwasaki et al. |
| 8,605,391 B2 | 12/2013 | Koui et al. |
| 8,953,283 B2 * | 2/2015 | Shimizu et al. ............ 360/125.3 |
| 2005/0219771 A1 | 10/2005 | Sato et al. |
| 2007/0086121 A1 | 4/2007 | Nagase et al. |
| 2008/0268291 A1 | 10/2008 | Akiyama et al. |
| 2009/0225465 A1 | 9/2009 | Iwasaki et al. |
| 2009/0316303 A1 | 12/2009 | Yamada et al. |
| 2010/0118600 A1 | 5/2010 | Nagase et al. |
| 2011/0064969 A1 * | 3/2011 | Chen et al. .................... 428/800 |
| 2011/0279921 A1 | 11/2011 | Zhang et al. |
| 2012/0008381 A1 | 1/2012 | Nagase et al. |
| 2012/0134054 A1 | 5/2012 | Takeo et al. |
| 2012/0154952 A1 | 6/2012 | Yamada et al. |
| 2012/0176702 A1 | 7/2012 | Yamada et al. |
| 2012/0262821 A1 | 10/2012 | Taguchi et al. |
| 2013/0029035 A1 | 1/2013 | Zhang et al. |
| 2013/0029182 A1 | 1/2013 | Zhang et al. |
| 2013/0050869 A1 | 2/2013 | Nagasaka et al. |
| 2014/0146420 A1 | 5/2014 | Shimizu et al. |
| 2014/0177092 A1 * | 6/2014 | Katada et al. .................. 360/75 |

FOREIGN PATENT DOCUMENTS

| | | |
|---|---|---|
| JP | 2010-003354 A | 1/2010 |
| JP | 2010-021580 | 1/2010 |
| JP | 2011-238932 | 11/2011 |
| JP | 2012-119027 A | 6/2012 |
| JP | 2012-226799 | 11/2012 |

OTHER PUBLICATIONS

U.S. Appl. No. 14/101,206, filed Dec. 9, 2013, Shimizu et al.

* cited by examiner

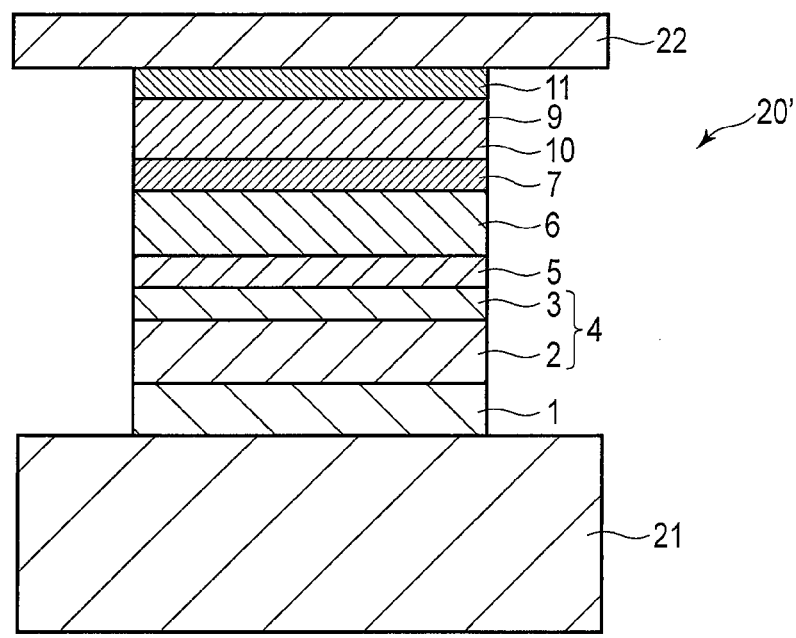
F I G. 3
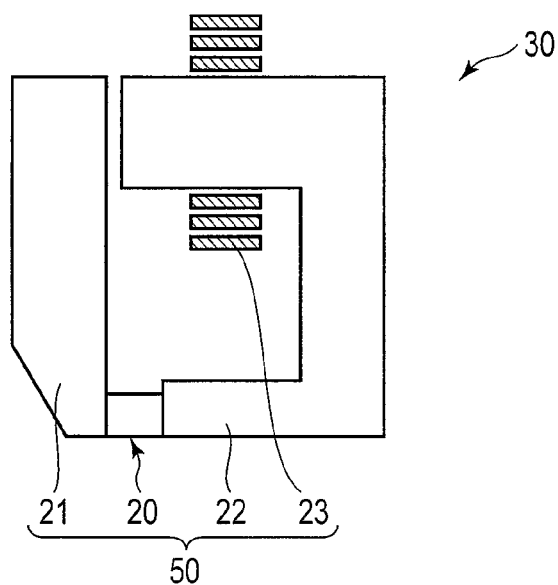
F I G. 4

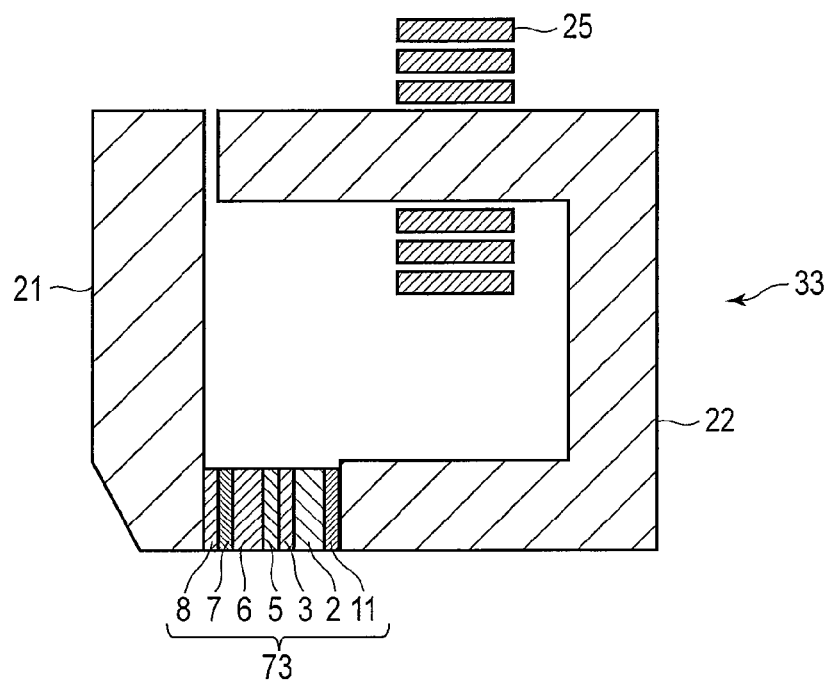
F I G. 9
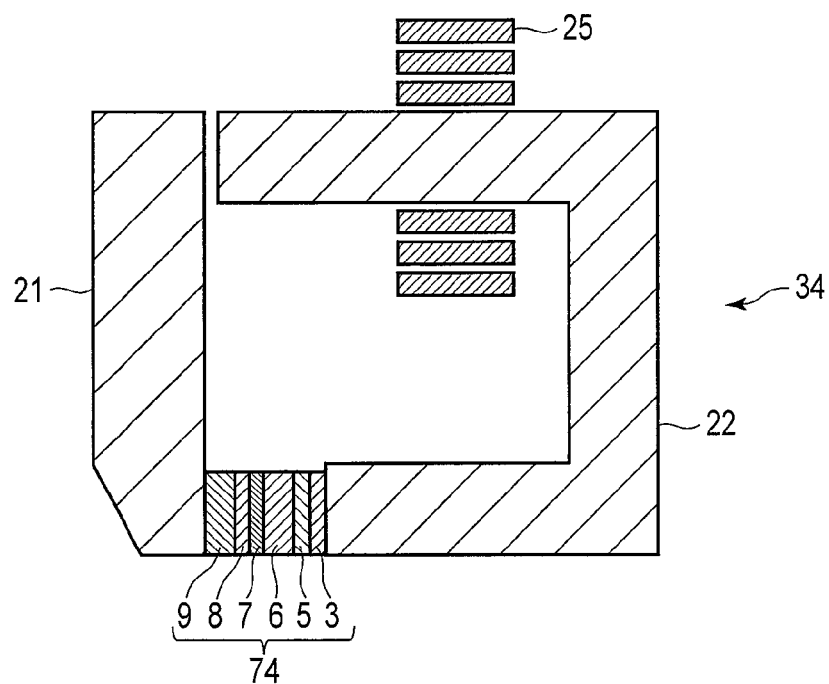
F I G. 10

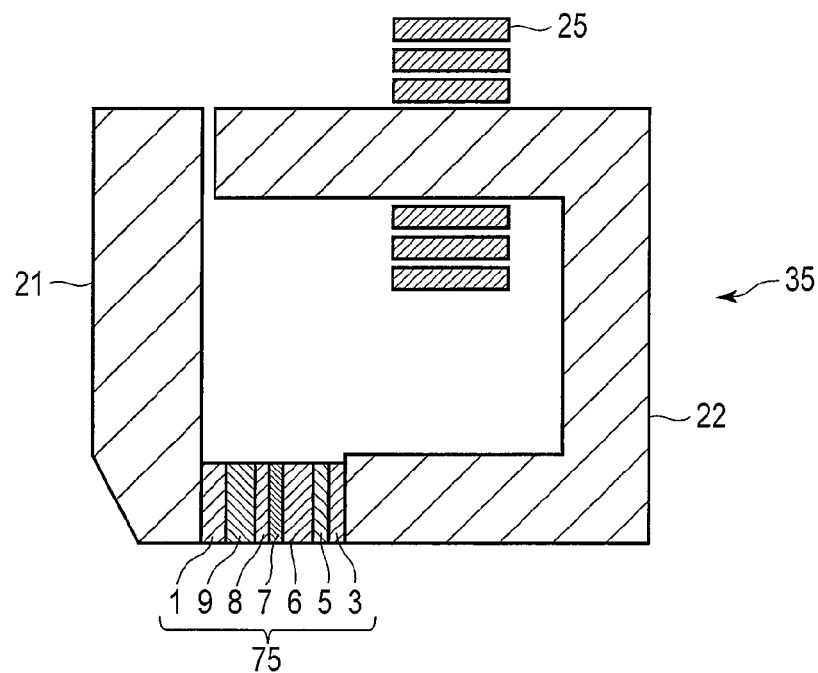
F I G. 11
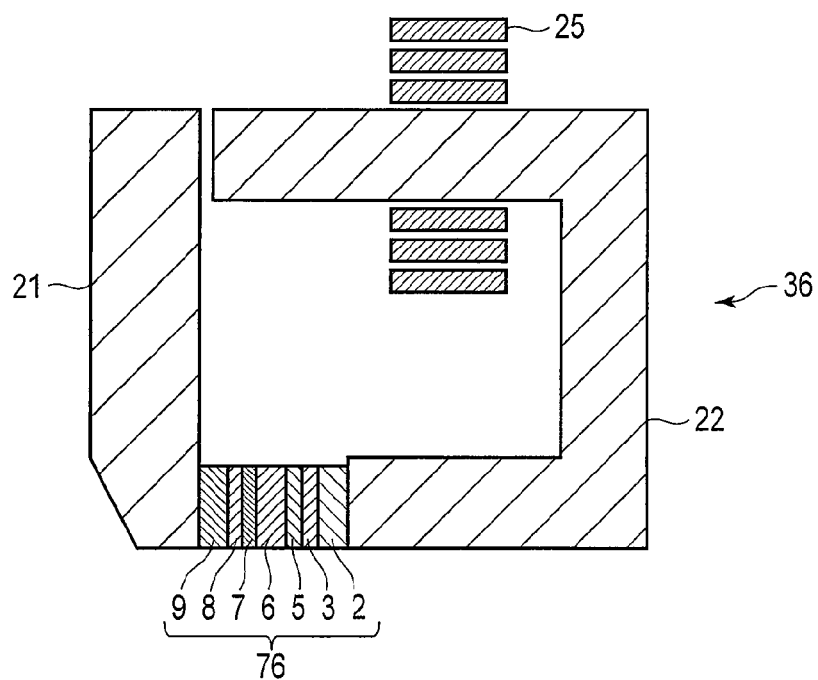
F I G. 12

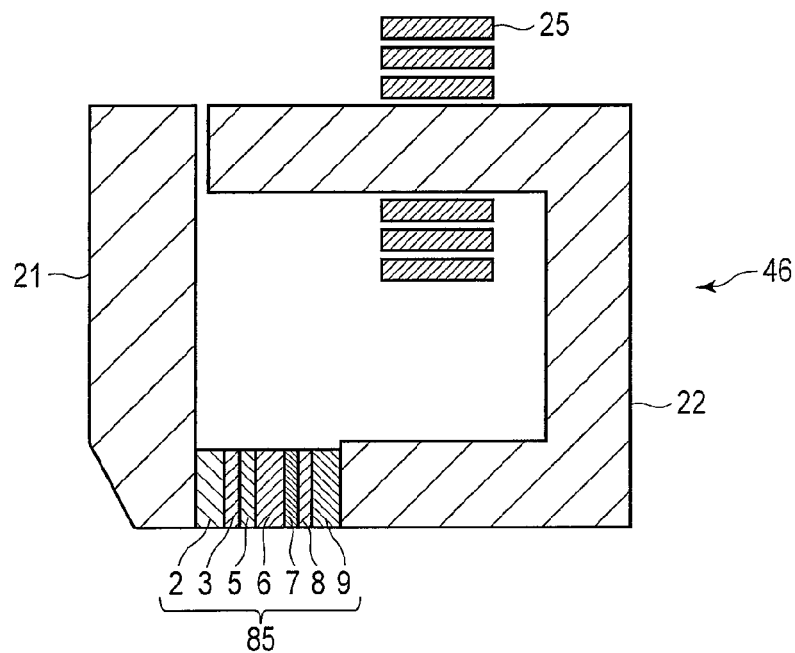
F I G. 21
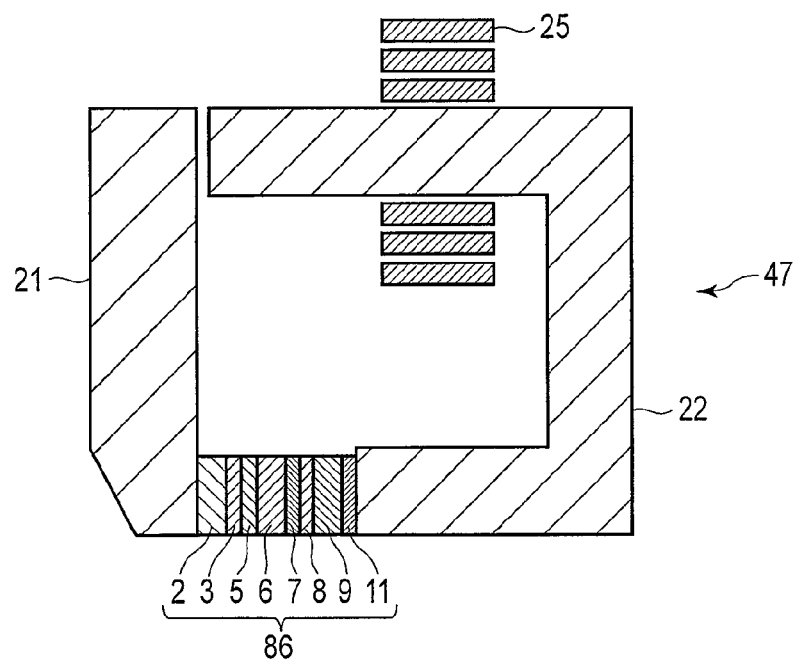
F I G. 22

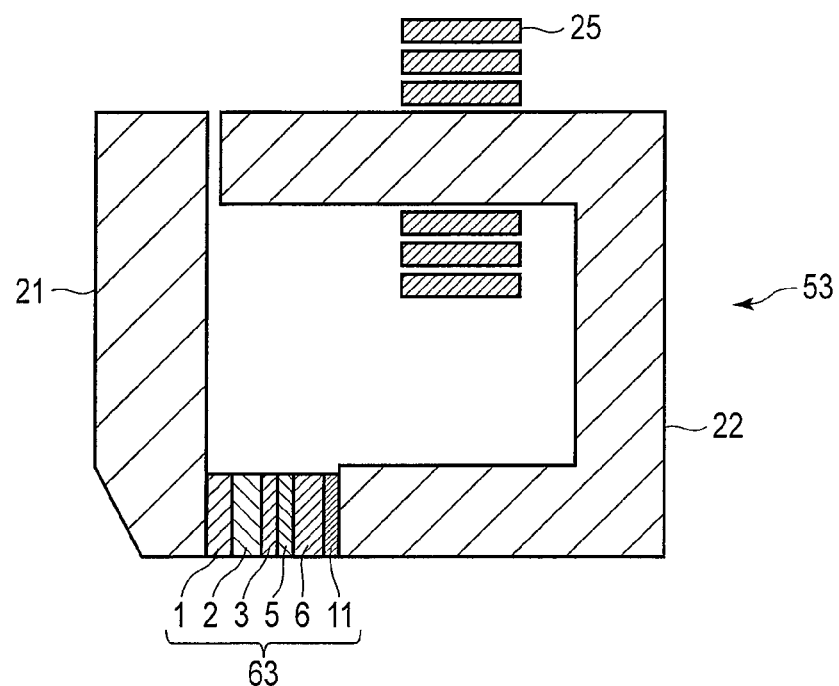
F I G. 27

MAGNETIC HEAD, MAGNETIC HEAD ASSEMBLY, AND MAGNETIC RECORDING/REPRODUCTION APPARATUS

CROSS REFERENCE TO RELATED APPLICATIONS

This application is a Divisional Application of U.S. patent application Ser. No. 14/101,206, filed Dec. 9, 2013, which is a Continuation-in-Part Application of U.S. patent application Ser. No. 13/777,933, filed Feb. 26, 2013 and based upon and claiming the benefit of priority from Japanese Patent Applications No. 2012-260832, filed Nov. 29, 2012; and No. 2013-234725, filed Nov. 13, 2013, the entire contents of all of which are incorporated herein by reference.

FIELD

Embodiments described herein relate generally to a magnetic head, magnetic head assembly, and magnetic recording/reproduction apparatus.

BACKGROUND

Perpendicular magnetic recording more advantageous for high-density recording in principle than longitudinal magnetic recording is increasing the recording density of a hard disk drive (HDD) by about 40% per year. Even when using this perpendicular magnetic recording method, however, it is probably not easy to increase the recording density because the problem of thermal decay becomes conspicuous.

"A high-frequency magnetic field assisted recording method" has been proposed as a recording method capable of solving this problem. In this high-frequency magnetic field assisted recording method, a high-frequency magnetic field near the resonance frequency of a magnetic recording medium, which is much higher than a recording signal frequency, is locally applied to the medium. Consequently, the medium resonates, and the coercive force (Hc) in that portion of the medium to which the high-frequency magnetic field is applied becomes half or less the original coercive force. By superposing a high-frequency magnetic field on a recording magnetic field by using this effect, magnetic recording can be performed on a medium having a higher coercive force (Hc) and higher magnetic anisotropic energy (Ku). If a high-frequency magnetic field is generated by a coil, however, it is difficult to efficiently apply the high-frequency magnetic field to a medium.

As high-frequency magnetic field generating means, therefore, methods using spin torque oscillators have been proposed. In techniques disclosed in these methods, a spin torque oscillator includes a spin transfer layer, an interlayer, a magnetic material layer (oscillation layer), and electrodes. When a direct current is supplied to the spin torque oscillator through the electrodes, a spin torque generated by the spin transfer layer causes the ferromagnetic resonance of magnetization of the magnetic material layer. As a consequence, the spin torque oscillator generates a high-frequency magnetic field. Since the size of the spin torque oscillator is about a few ten nm, the generated high-frequency magnetic field locally exists in a region of about a few ten nm in the vicinity of the spin torque oscillator. Furthermore, the longitudinal component of the high-frequency magnetic field can efficiently resonate a perpendicularly magnetized medium, and this makes it possible to largely decrease the coercive force of the medium. As a result, high-density magnetic recording is performed in only a portion where a recording magnetic field generated by a main magnetic pole and the high-frequency magnetic field generated by the spin torque oscillator are superposed on each other, so a medium having a high coercive force (Hc) and high magnetic anisotropic energy (Ku) can be used. Accordingly, the problem of thermal decay during high-density recording can be avoided.

To implement a high-frequency magnetic field assisted recording head, it is important to design and manufacture a spin torque oscillator capable of stably oscillating with a low driving current, and generating a longitudinal high-frequency magnetic field that sufficiently resonates medium magnetization.

A maximum current density that can be supplied to the spin torque oscillator is $2\times10^8$ A/cm$^2$ when the element size is, e.g., about 70 nm. If the current density is higher than that, the characteristics deteriorate due to, e.g., heat generation and migration of the spin torque oscillator. This makes it important to design a spin torque oscillator capable of oscillating at as low a current density as possible.

On the other hand, to sufficiently resonate medium magnetization, the intensity of the longitudinal high-frequency magnetic field is reportedly desirably 10% or more of the anisotropic magnetic field (Hk) of the medium. Examples of a means for increasing the intensity of the longitudinal high-frequency magnetic field are increasing the saturation magnetization of the oscillation layer, increasing the thickness of the oscillation layer, and increasing the rotational angle of magnetization of the oscillation layer. Unfortunately, all these means increase the driving current.

As described above, decreasing the density of the driving current is inconsistent with increasing the intensity of the longitudinal high-frequency magnetic field, and it is desirable to implement a spin torque oscillator capable of achieving both of these demands.

BRIEF DESCRIPTION OF THE DRAWINGS

FIG. 3 is a sectional view showing a spin torque oscillator according to the first embodiment;

FIG. 4 is a schematic view showing an example of a magnetic head according to an embodiment;

FIG. 9 is a schematic view showing an example of a magnetic head according to an embodiment;

FIG. 10 is a schematic view showing an example of a magnetic head according to an embodiment;

FIG. 11 is a schematic view showing an example of a magnetic head according to an embodiment;

FIG. 12 is a schematic view showing an example of a magnetic head according to an embodiment;

FIG. 21 is a schematic view showing an example of a magnetic head according to an embodiment;

FIG. 22 is a schematic view showing an example of a magnetic head according to an embodiment;

FIG. 27 is a schematic view showing an example of a magnetic head according to an embodiment.

DETAILED DESCRIPTION

Figure 1:
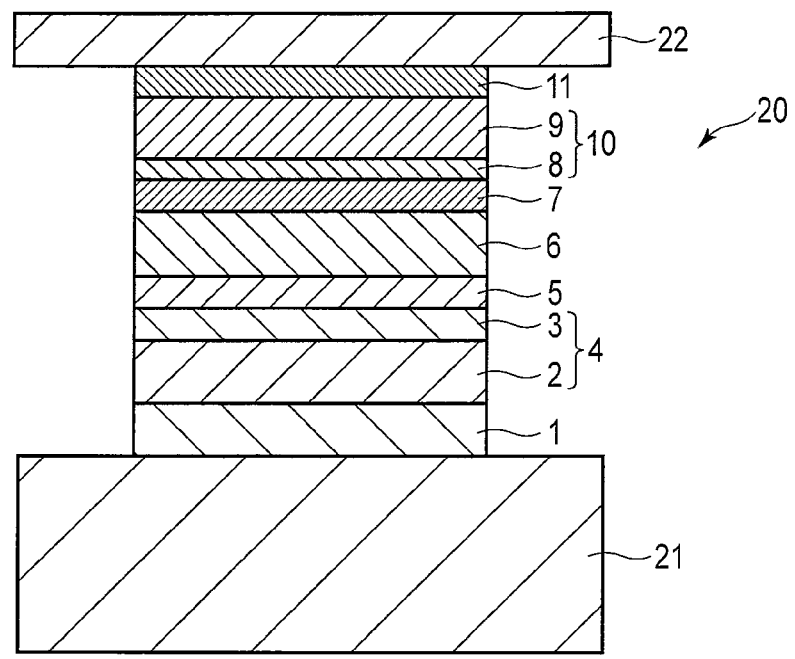
FIG. 1 is a sectional view showing a spin torque oscillator according to the second embodiment.

A magnetic head according to the first embodiment includes a main magnetic pole for applying a recording magnetic field to a magnetic recording medium, an auxiliary magnetic pole for forming a magnetic circuit together with the main magnetic pole, and a spin torque oscillator formed between the main magnetic pole and auxiliary magnetic pole.

The spin torque oscillator used in the first embodiment includes a transmission-type spin transfer layer, a first interlayer formed on the transmission-type spin transfer layer, an oscillation layer formed on the first interlayer, a second interlayer formed on the oscillation layer, and a reflection-type spin transfer layer formed on the second interlayer.

The transmission-type spin transfer layer used in the first embodiment includes a first perpendicular magnetization film formed on one of the main magnetic pole and auxiliary magnetic pole, and a first interface magnetic layer formed on the first perpendicular magnetization film.

The first interface magnetic layer used in the first embodiment contains at least one element selected from the group consisting of iron, cobalt, and nickel, and at least one element selected from the group consisting of chromium, vanadium, manganese, titanium, and scandium.

The reflection-type spin transfer layer used in the first embodiment includes a second perpendicular magnetization film.

A magnetic head according to the second embodiment has the same arrangement as that of the magnetic head according to the first embodiment, except that the reflection-type spin transfer layer includes a second interface magnetic layer formed on the second interlayer, and a second perpendicular magnetization film formed on the second interface magnetic layer.

According to the embodiment, the spin torque oscillator is given the structure including the transmission-type spin transfer layer, the reflection-type spin transfer layer, and the oscillation layer formed between these two spin transfer layers. Since the transmission-type spin transfer layer is made of the material that applies a negative spin torque to the oscillation layer and the reflection-type spin transfer layer is made of the material that applies an ordinary positive spin torque, it is possible to reduce the oscillation start voltage, i.e., the critical current density of the oscillation layer.

The reflection-type spin transfer layer used in the embodiment herein mentioned is a spin transfer layer in which electrons reflected through the layer are spin-polarized antiparallel to magnetization.

Also, the transmission-type spin transfer layer used in the embodiment is a spin transfer layer in which electrons transmitted through the layer are spin-polarized antiparallel to magnetization.

The first and second perpendicular magnetization films used in the embodiment have the same composition or different compositions. The material of the first and second perpendicular magnetization films can be formed by alternately stacking a layer made of at least one element selected from the group consisting of Fe and Co, and a layer made of at least one element selected from the group consisting of Fe, Co, Ni, Pt, Pd, and Cu. Examples are artificial lattices such as FeCo/Ni, CoFe/Ni, Co/Ni, Co/Pt, Co/Pd, and Fe/Pt. As the first and second perpendicular magnetization films, it is also possible to use CoCr-based alloys such as CoCrPt, CoCrTa, CoCrTaPt, and CoCrTaNb, RE-TM-based amorphous alloys such as TbFeCo, FePt-based alloys, CoPt-based alloys, and SmCo-based alloys.

The first and second perpendicular magnetization films each have a thickness of 2 to 20 nm. If the thickness is less than 2 nm, the film is often unable to withstand the reaction of spin torque. If the thickness exceeds 20 nm, magnetization in the film thickness direction may become nonuniform.

The first interface magnetic layer is made of an alloy containing at least one element selected from the group consisting of Fe, Co, and Ni, and at least one element selected from the group consisting of Cr, V, Mn, Ti, and Sc.

Namely, examples of materials of the first interface magnetic layer are FeCr, FeV, FeTi, CoCr, CoMn, NiCr, NiV, and NiTi. With the first interface magnetic layer made of such materials, when a magnetoresistance element comprising a free layer of an FeCo alloy and a pin layer of the first interface magnetic layer is given, a negative magnetoresistance MR ratio is exerted. The concentration of the one element selected from the group consisting of Cr, V, Mn, Ti, and Sc can be determined based on the following conditions. The minimum element concentration is a concentration by which the spin torque becomes negative. That is, the minimum element concentration is a concentration that can generate the oscillation when current is supplied from an oscillation layer to a spin injection layer while the magnetization of the oscillation layer and the magnetization of the spin injection layer are parallel with each other.

The maximum element concentration is a concentration by which the magnetization does not vanish. Keeping this condition, the Cr addition amount in the FeCr alloy can be 1 to 80 at %, the V addition amount in the FeV alloy can be 1 to 65 at %, the Cr addition amount in the CoCr alloy can be 1 to 30 at %, the Cr addition amount in the NiCr alloy can be 1 to 10 at %, and the V addition amount in the NiV alloy can be 1 to 10 at %, for example.

The film thickness of the first interface magnetic layer can be determined based on the following conditions. The minimum film thickness is a thickness by which the spin torque becomes negative. The maximum film thickness is a thickness in which the magnetization of the first interface magnetic layer faces a perpendicular direction. These values may vary depending on elements and manufacturing methods, etc. The first interface magnetic layer can have a thickness of, e.g., 0.1 to 20 nm.

If the thickness is less than 0.1 nm, the spin transfer ability often disappears. If the thickness exceeds 20 nm, the critical current density tends to increase because magnetization on the side of the first interlayer inclines in the longitudinal direction.

The first interlayer is made of, for example, Cu, Al, Ag, and Au, and in addition, made of Cr, Cu/Cr, Al/Cr, Ag/Cr, and Au/Cr. With Cr provided with the first interface magnetic layer side, the injection efficiency of the negative spin torque can be enlarged. When current is supplied from the oscillation layer to the first interface magnetic layer, an electron having spin antiparallel to the magnetization flows into the first interlayer from the first interface magnetic layer and becomes a source of the spin torque. Here, when the first interlayer is made of Cu, the electron is dispersed upon the interface, and in such a case, Cr provided with the first interface magnetic layer side can suppress the dispersion, and consequently, the spin injection efficiency can be enlarged.

The second interlayer is made of such materials as Cu, Al, Ag, and Au those are known that their spin dispersion length is long.

The thickness of the first interlayer can be 0.5 to 50 nm.

If the thickness of the first interlayer is less than 0.5 nm, the magnetostatic magnetic coupling between the spin transfer layer and oscillation layer often raises the critical current density. If the thickness exceeds 50 nm, the critical current density tends to rise because spins are disturbed in the interlayer.

The thickness of the second interlayer can be 0.5 to 50 nm for the same reason.

The oscillation layer is formed by a magnetic alloy film or artificial lattice containing at least one element selected from the group consisting of Fe, Co, and Ni, and it is possible to use, e.g., an FeCo alloy, Fe/Co artificial lattice, or FeCo/Ni artificial lattice. Alternatively, the oscillation layer is formed by a magnetic alloy film containing at least one element selected from a first group consisting of Fe and Co, and at least one element selected from a second group consisting of Al, Si, Ga, Ge, Cu, Ag, Au, B, Mn, and Sn. An example is an FeCoAl alloy.

To generate a sufficient high-frequency magnetic field intensity, the magnetic volume (the product of saturation magnetization Ms (T) and the film thickness (nm)) of the oscillation layer can be 20 nmT or more. For this purpose, the film thickness of, e.g., an FeCo alloy magnetic film can be 8.3 nm or more. The film thickness can be 20 nm or less. If the film thickness exceeds 20 nm, magnetization in the oscillation layer distributes in the film thickness direction, so the oscillation layer does not uniformly oscillate any longer.

The second interface magnetic layer is made of a combination of an amorphous magnetic film and a highly oriented magnetic film, or a highly oriented magnetic film alone. As the amorphous magnetic film, CoZrNb and CoFeB can be used, for example. The phrase "highly oriented" here means that its crystalline orientation is constant with respect to a perpendicular direction to the film surface. The highly oriented magnetic film may be polycrystalline or single-crystalline. When the highly oriented magnetic film is polycrystalline, the orientation of each grain should be even only with respect to the perpendicular direction to the film surface and is not necessarily be even with respect to a parallel direction to the film surface. The highly oriented magnetic film is made of, for example, FeCo alloy, FeCo alloy with at least one element selected from the group consisting of Al, Si, Ga, Ge, Cu, Ag, and B, and Fe/Co artificial lattice. Furthermore, a Heusler alloy such as $Co_2MnGe$, $Co_2MnSi$, $Co_2FeMnSi$, and $Co_2FeGaGe$ may be used.

The thickness of the second interface magnetic layer can be 0.1 to 20 nm.

If the thickness of the second interface magnetic layer is less than 0.1 nm, the spin transfer ability tends to disappear. If the thickness exceeds 20 nm, the critical current density tends to increase because magnetization on the side of the first interlayer inclines in the longitudinal direction.

In the case that the perpendicular magnetic anisotropy of the second perpendicular magnetization film significantly decreases on the second interface magnetic layer, the arrangement of the first embodiment including no second interface magnetic film shows a higher spin transfer ability. Since the second perpendicular magnetization film singly has reflection-type spin transfer ability, the film can operate by the same operating principle as that shown in FIG. 2 without any second interface magnetic layer.

According to the third embodiment, there is provided a magnetic head assembly including
the magnetic head according to the first embodiment,
a head slider on which the magnetic head is mounted,
a suspension on one end of which the head slider is mounted, and
an actuator arm connected to the other end of the suspension.

According to the fourth embodiment, there is provided a magnetic head assembly including
the magnetic head according to the second embodiment,
a head slider on which the magnetic head is mounted,
a suspension on one end of which the head slider is mounted, and
an actuator arm connected to the other end of the suspension.

A magnetic recording/reproduction apparatus according to the fifth embodiment includes a magnetic recording medium, and the magnetic head according to the first embodiment.

A magnetic recording/reproduction apparatus according to the sixth embodiment includes a magnetic recording medium, and the magnetic head according to the second embodiment.

In the third to sixth embodiments, data can be written on a magnetic recording medium for a high recording density because a large high-frequency magnetic field can be generated.

The embodiments of the present invention will be explained below with reference to the accompanying drawings.

FIG. 1 is a sectional view showing the spin torque oscillator according to the second embodiment. As shown in FIG. 1, a spin torque oscillator 20 according to the embodiment has a structure in which a multilayered film is formed between a main magnetic pole 21 as a lower electrode and an auxiliary magnetic pole 22 as an upper electrode.

The spin torque oscillator 20 has a double spin transfer layer structure in which a transmission-type spin transfer layer 4 is formed on an underlayer 1, a first interlayer 5 is formed on the transmission-type spin transfer layer 4, an oscillation layer 6 is formed on the first interlayer 5, a second interlayer 7 is formed on the oscillator layer 6, an reflection-type spin transfer layer 10 is formed on the second interlayer 7, and a cap layer 11 is formed on the reflection-type spin transfer layer 10. The reflection-type spin transfer layer 10 is the same as an ordinary spin transfer layer. By forming the transmission-type spin transfer layer 4 in addition to the reflection-type spin transfer layer 10, the spin torque oscillator 20 capable of oscillating at a low critical current density can be provided.

Figure 2:
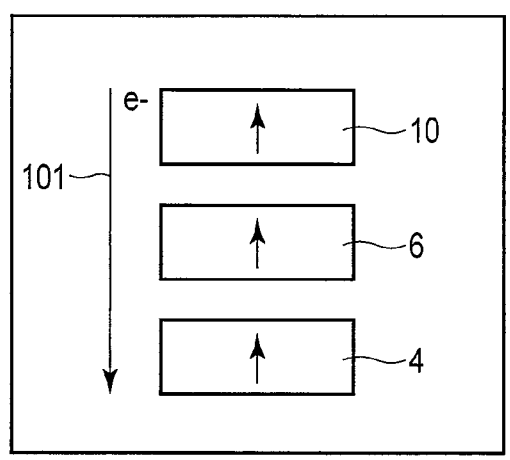
FIG. 2 is a view showing the driving principle of the spin torque oscillator shown in FIG. 1.

FIG. 2 is a view showing the driving principle of the spin torque oscillator 20 shown in FIG. 1.

In a direction in which an electric current is supplied from the reflection-type spin transfer layer 10 to the oscillation layer 6 and from the oscillation layer 6 to the transmission-type spin transfer layer 4 as indicated by an arrow 101, the oscillation layer 6 can receive spin torques from both the spin transfer layers 4 and 10. This is so because the reflection-type spin transfer layer is made of the material that oscillates the oscillation layer in the same current supply direction as that of an ordinary spin transfer layer, and the transmission-type spin transfer layer is made of the material that oscillates the oscillation layer in a current supply direction opposite to that of an ordinary spin transfer layer material.

The arrangement of the spin torque oscillator shown in FIG. 1 will be explained in more detail below.

The transmission-type spin transfer layer 4 includes a first perpendicular magnetization film 2 and first interface magnetic layer 3, and the first interface magnetic layer 3 is formed on the side of the first interlayer 5. The first interface magnetic layer 2 is made of a material having the spin transmission ability, and the first perpendicular magnetization film 2 is formed to give perpendicular magnetic anisotropy to the first interface magnetic layer 3. The reflection-type spin transfer layer 10 includes a second interface magnetic layer 8 and second perpendicular magnetization film 9, and the second interface magnetic layer 8 is formed on the side of the second interlayer 7. The second interface magnetic layer 8 is made of a material having a high down-spin reflection ability, and the second perpendicular magnetization film 9 is formed to give perpendicular magnetic anisotropy to the second interface magnetic layer 8. The first and second interface magnetic layers 3 and 9 are made of different materials because they have entirely different functions. The first and second perpendicular magnetization films 2 and 9 can be made of the same material.

FIG. 3 is a sectional view showing the spin torque oscillator according to the first embodiment.

A spin torque oscillator 20' has the same arrangement as that shown in FIG. 2 except that an reflection-type spin transfer layer 10 includes only a second perpendicular magnetization film 9. In the case that the perpendicular magnetic anisotropy of the second perpendicular magnetization film 9 significantly decreases on the second interface magnetic layer, the arrangement of the first embodiment including no second interface magnetic layer shows a higher spin transfer ability. Since the second perpendicular magnetization film singly has reflection-type spin transfer ability, the film can operate by the same operating principle as that shown in FIG. 2 without any second interface magnetic layer.

FIG. 4 is a schematic view showing an example of a magnetic head according to an embodiment.

A magnetic head 30 according to the embodiment includes a read head unit (not shown) and write head unit 50. The read head unit (not shown) includes a magnetic read element (not shown), and shield. The write head unit 50 includes a main magnetic pole 21 as a recording magnetic pole, a trailing shield (auxiliary magnetic pole) 22 for returning a magnetic field from the main magnetic pole 21, a spin torque oscillator 20 formed between the main magnetic pole 21 and trailing shield (auxiliary magnetic pole) 22, and an excitation coil 23. In the write head unit 50 of the high-frequency magnetic field assisted recording head 30, a gap magnetic field between the main magnetic pole 21 and trailing shield 22 applies an external magnetic field perpendicular to the film surfaces. Consequently, the oscillation layer performs precession around an axis almost perpendicular to the film surfaces as a rotational axis, thereby generating a high-frequency magnetic field outside. By superposing this high-frequency magnetic field generated from the spin torque oscillator on a magnetic field applied from the main magnetic pole, data can be written on a magnetic recording medium more suited to a high recording density.

In the embodiment, a spin torque oscillator having a low critical current density can be used as a high-frequency magnetic field generating source. This makes it possible to reverse the magnetization of a magnetic recording medium with a large high-frequency magnetic field.

Figure 5:
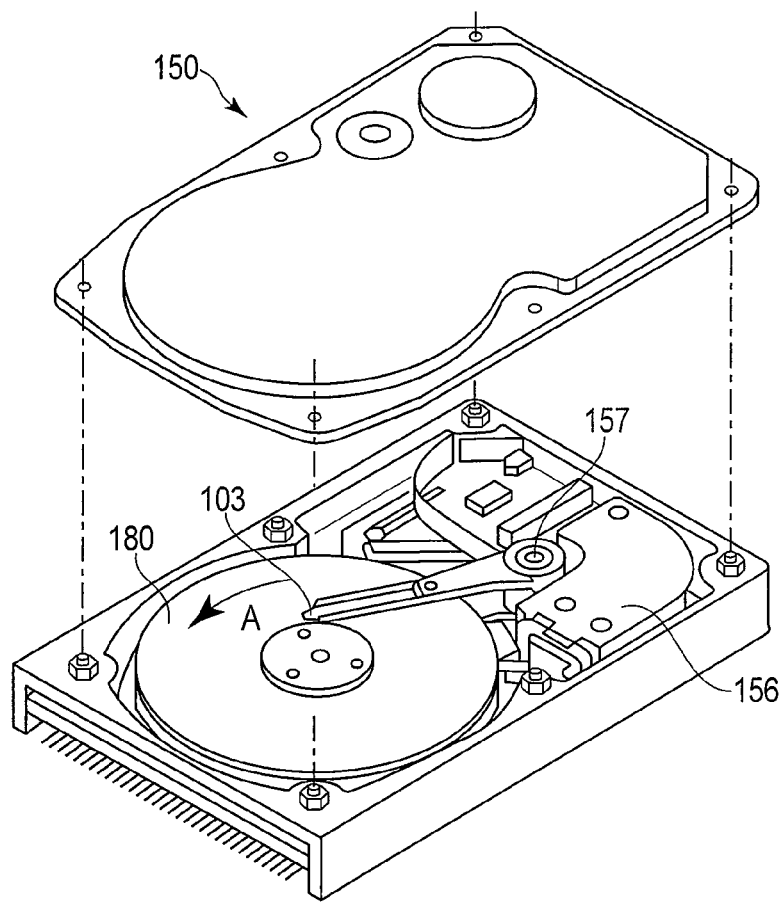
FIG. 5 is a schematic view showing an example of a magnetic recording/reproduction apparatus according to an embodiment.

FIG. 5 is a perspective view showing the schematic arrangement of the main part of a magnetic recording/reproduction apparatus capable of incorporating the magnetic head according to the embodiment.

That is, a magnetic recording/reproduction apparatus 150 is an apparatus using a rotary actuator.

Referring to FIG. 5, a recording medium disk 180 is fitted on a spindle 157, and rotated in the direction of an arrow A by a motor (not shown) that responds to a control signal from a driver controller (not shown). The magnetic recording/reproduction apparatus 150 may also include a plurality of medium disks 180.

A head slider 103 for performing recording and reproduction of information to be stored in the medium disk 180 has the arrangement as described above with reference to FIG. 4, and is attached to the distal end of a thin-film suspension 154. The magnetic head according to the embodiment, for example, is mounted near the distal end of the head slider 103.

When the medium disk 180 rotates, the air bearing surface (ABS) of the head slider 103 is held with a predetermined floating amount from the surface of the medium disk 180. The head slider 103 may also be a so-called "contact running type slider" that comes in contact with the medium disk 180.

The suspension 154 is connected to one end of an actuator arm 155 including a bobbin for holding a driving coil (not shown). A voice coil motor 156 as a kind of a linear motor is formed at the other end of the actuator arm 155. The voice coil motor 156 includes the driving coil (not shown) wound on the bobbin of the actuator arm 155, and a magnetic circuit including a permanent magnet and counter yoke facing each other so as to sandwich the coil between them.

The actuator arm 155 is held by ball bearings (not shown) formed in upper and lower portions of a spindle 157, and freely swung by the voice coil motor 156.

Figure 6:
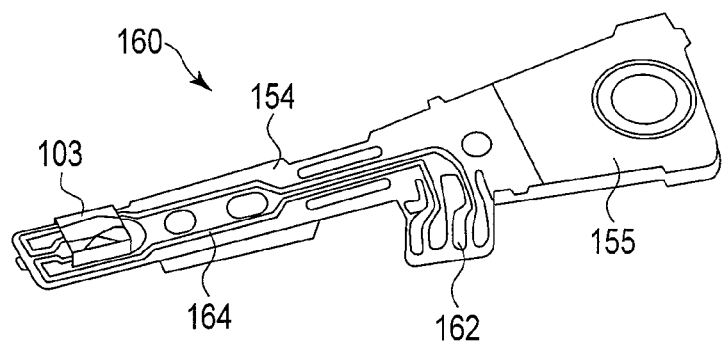
FIG. 6 is a schematic view showing an example of a magnetic head assembly according to an embodiment.

FIG. 6 is a schematic view showing an example of a magnetic head assembly according to an embodiment.

FIG. 6 is an enlarged perspective view showing, from the disk side, a magnetic head assembly formed ahead of an actuator arm 155. That is, a magnetic head assembly 160 includes the actuator arm 155 including a bobbin for holding a driving coil, and a suspension 154 is connected to one end of the actuator arm 155.

A head slider 103 including the magnetic head 30 shown in FIG. 4 is attached to the distal end of the suspension 154. The suspension 154 has lead wires 164 for signal write and read, and the lead wires 164 are electrically connected to the electrodes of the magnetic head incorporated into the head slider 103. Reference numeral 162 shown in FIG. 6 denotes electrode pads of the magnetic head assembly 160.

Seventh and eighth embodiments are transformation examples of the spin torque oscillator of first and second embodiments, respectively.

The magnetic head of the seventh embodiment comprises a main magnetic pole configured to apply a recording magnetic field into a magnetic recording medium, an auxiliary magnetic pole configuring a magnetic circuit in conjunction with the main magnetic pole, and a spin torque oscillator provided between the main magnetic pole and the auxiliary magnetic pole.

The spin torque oscillator used in the seventh embodiment comprises a downspin injection layer, first interlayer formed on the downspin injection layer, oscillation layer formed on the first interlayer, second interlayer formed on the oscillation layer, and upspin injection layer formed on the second interlayer.

The downspin injection layer used in the seventh embodiment comprises a first interface magnetic layer formed on either the main magnetic pole or the auxiliary magnetic pole. The upspin injection layer used in the seventh embodiment comprises the second interface magnetic layer.

Figure 7:
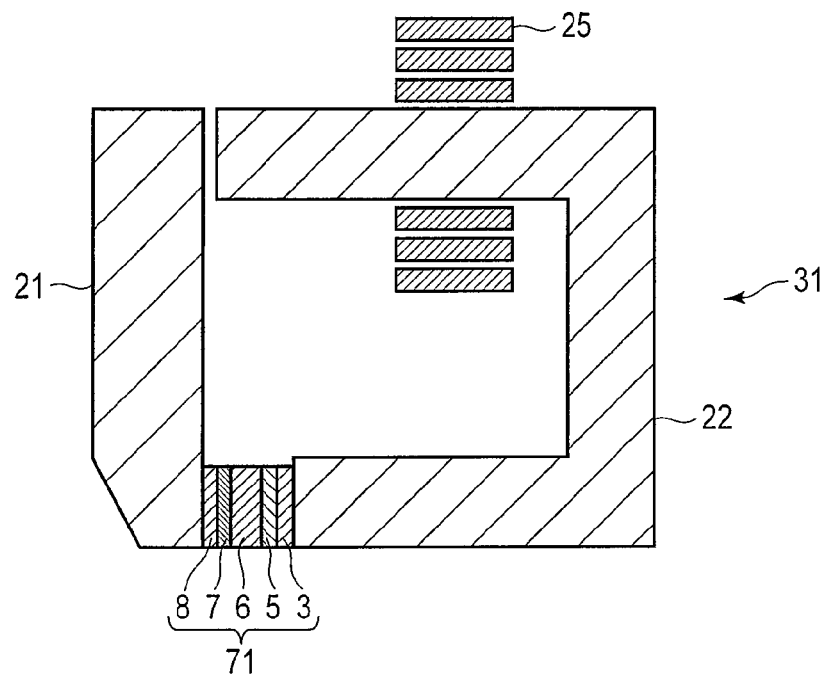
FIG. 7 is a schematic view showing an example of a magnetic head according to an embodiment.

FIG. 7 is a schematic sectional view showing an example of the magnetic recording head including the spin torque oscillator of the seventh embodiment.

The spin torque oscillator 71 shown in FIG. 7 has a layered structure to be provided between the main magnetic pole 21 which is a lower electrode and the auxiliary magnetic pole 22 which is an upper electrode, and has a dual spin injection layer structure. In the spin torque oscillator 71, the second interface magnetic layer 8 is formed on the main magnetic pole 21, the second interlayer 7 is formed on the second interface magnetic layer 8, the oscillation layer 6 is formed on the second interlayer 7, the first interlayer 5 is formed on the oscillation layer 6, the first interface magnetic layer 3 is formed on the first interlayer 5, and the auxiliary magnetic pole 22 is formed on the first interface magnetic layer 3. A magnetic recording head 31 comprises an excitation coil 25 configured to generate a recording field from the main magnetic pole. When current is supplied to the excitation coil 25, the main magnetic pole 21 and the auxiliary magnetic pole 22 form a magnetic circuit. Here, the magnetization near to the second interface magnetic layer 8 of the main magnetic pole 21, the magnetization of the second interface magnetic layer 8, the magnetization of the oscillation layer 6, the magnetization of the first interface magnetic layer 3, and the magnetization near to the first interface magnetic layer 3 of the auxiliary magnetic pole 22 face the perpendicular direction to the film surface. Since the magnetic volume KuV (magnetic anisotropy energy Ku×volume V) is very large, the magnetization of the second interface magnetic layer 8 or of the first interface magnetic layer 3 which has a magnetic exchange coupling with the main magnetic pole 21 or with the auxiliary magnetic pole 22 stably faces the perpendicular direction, and functions as a spin injection layer. Furthermore, when the second interface magnetic layer 8 is made of materials those apply a positive spin torque to the oscillation layer and the first interface magnetic layer 3 is made of materials those apply negative spin torque to the oscillation layer, the spin torque can be transferred to the oscillation layer 6 from both the spin injection layers. Here, the materials those apply the positive spin torque to the oscillation layer are spin injection layer materials those can generate the oscillation when current is supplied from the spin injection layer to the oscillation layer 6 while the magnetization of the oscillation layer 6 and the magnetization of the spin injection layer are parallel with each other. The materials those apply the negative spin torque to the oscillation layer are spin injection layer materials those can generate the oscillation when current is supplied from the oscillation layer 6 to the spin injection layer while the magnetization of the oscillation layer 6 and the magnetization of the spin injection layer.

As a comparison, a case where the first interface magnetic layer 3 and the first interlayer 5 in FIG. 7 are replaced with a cap layer is considered here. In that case, it is acknowledged that the second interface magnetic layer 8 is perpendicularly magnetized by an exchange coupling with the main magnetic pole 21 and gives positive spin torque to the oscillation layer 6 while the auxiliary magnetic pole 22 which is also perpendicularly magnetized gives positive spin torque to the oscillation layer 6. When positive spin torques are given to both top and bottom of the oscillation layer 6, they cancel each other and the spin injection from the one side is lost.

On the other hand, the spin torque oscillator 71 in FIG. 7 gives the negative spin torque to the top of the oscillation layer 6 and the positive spin torque to the bottom of the oscillation layer 6 so that they can be added with each other. Consequently, the dual spin injection layer structure shown in FIG. 7 effectively reduces the voltage necessary for the oscillation in comparison with the comparative single spin injection layer structure above.

FIGS. 8 to 15 are schematic sectional views showing another example of the magnetic recording head including the spin torque oscillator of the seventh embodiment.

As shown in FIGS. 8 to 15, a first perpendicular magnetic film 2 can be formed between the first interface magnetic layer 3 and the auxiliary magnetic pole 22, and/or a second perpendicular magnetic film 9 can be formed between the second interface magnetic layer 8 and the main magnetic pole 21.

Figure 8:
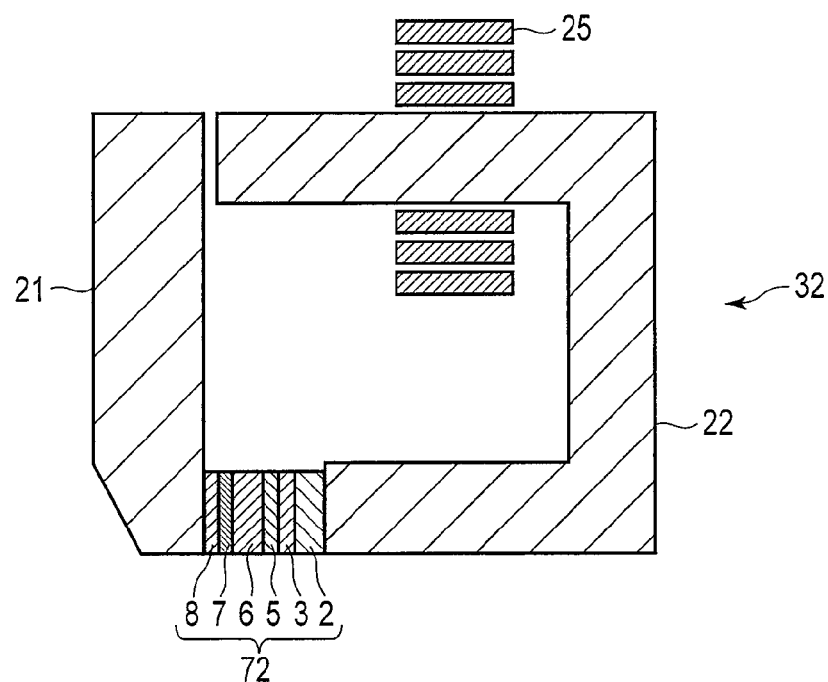
FIG. 8 is a schematic view showing an example of a magnetic head according to an embodiment.

The magnetic recording head 32 shown in FIG. 8 is structured the same as the magnetic recording head 31 in FIG. 7 except that, in comparison to the spin torque oscillator 71 in FIG. 7, the spin torque oscillator 72 in FIG. 8 includes the first perpendicular magnetic film 2 between the first interface magnetic layer 3 and the auxiliary magnetic pole 22.

The magnetic recording head 33 shown in FIG. 9 is structured the same as the magnetic recording head 31 in FIG. 7 except that, in comparison to the spin torque oscillator 71 in FIG. 7, the spin torque oscillator 73 in FIG. 9 includes the first perpendicular magnetic film 2 and a cap layer 11 between the first interface magnetic layer 3 and the auxiliary magnetic pole 22.

The magnetic recording head 34 shown in FIG. 10 is structured the same as the magnetic recording head 31 in FIG. 7 except that, in comparison to the spin torque oscillator 71 in FIG. 7, the spin torque oscillator 74 in FIG. 10 includes the second perpendicular magnetic film 9 between the second interface magnetic layer 8 and the main magnetic pole 21.

The magnetic recording head 35 shown in FIG. 11 is structured the same as the magnetic recording head 31 in FIG. 7 except that, in comparison to the spin torque oscillator 71 in FIG. 7, the spin torque oscillator 75 in FIG. 11 includes the second perpendicular magnetic film 9 and a base layer 1 between the second interface magnetic layer 8 and the main magnetic pole 21.

The magnetic recording head 36 shown in FIG. 12 is structured the same as the magnetic recording head 31 in FIG. 7 except that, in comparison to the spin torque oscillator 71 in FIG. 7, the spin torque oscillator 76 in FIG. 12 includes the first perpendicular magnetic film 2 between the first interface magnetic layer 3 and the auxiliary magnetic pole 22, and includes the second perpendicular magnetic film 9 between the second interface magnetic layer 8 and the main magnetic pole 21.

Figure 13:
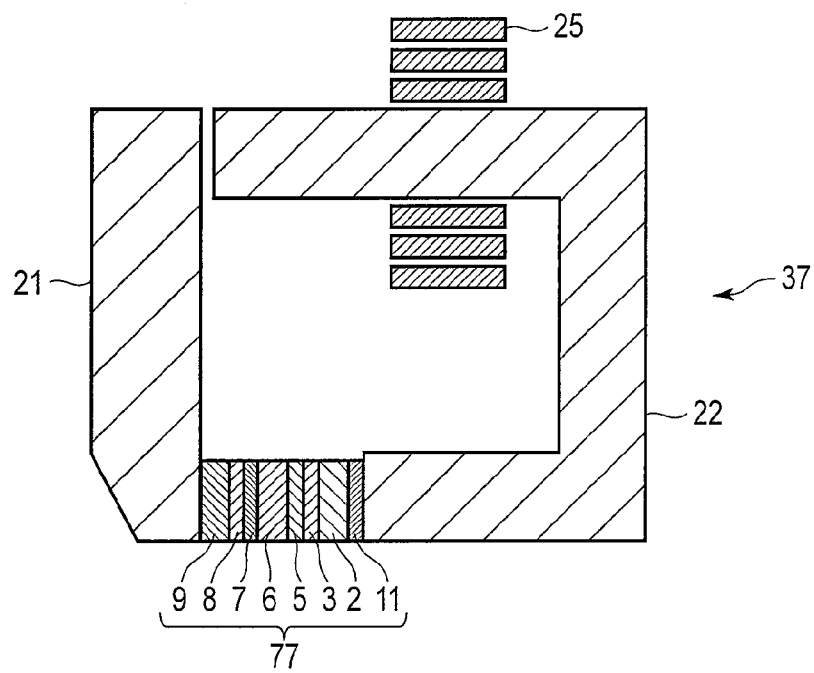
FIG. 13 is a schematic view showing an example of a magnetic head according to an embodiment.

The magnetic recording head 37 shown in FIG. 13 is structured the same as the magnetic recording head 31 in FIG. 7 except that, in comparison to the spin torque oscillator 71 in FIG. 7, the spin torque oscillator 77 in FIG. 13 includes the first perpendicular magnetic film 2 and the cap layer 11 between the first interface magnetic layer 3 and the auxiliary magnetic pole 22, and includes the second perpendicular magnetic film 9 between the second interface magnetic layer 8 and the main magnetic pole 21.

Figure 14:
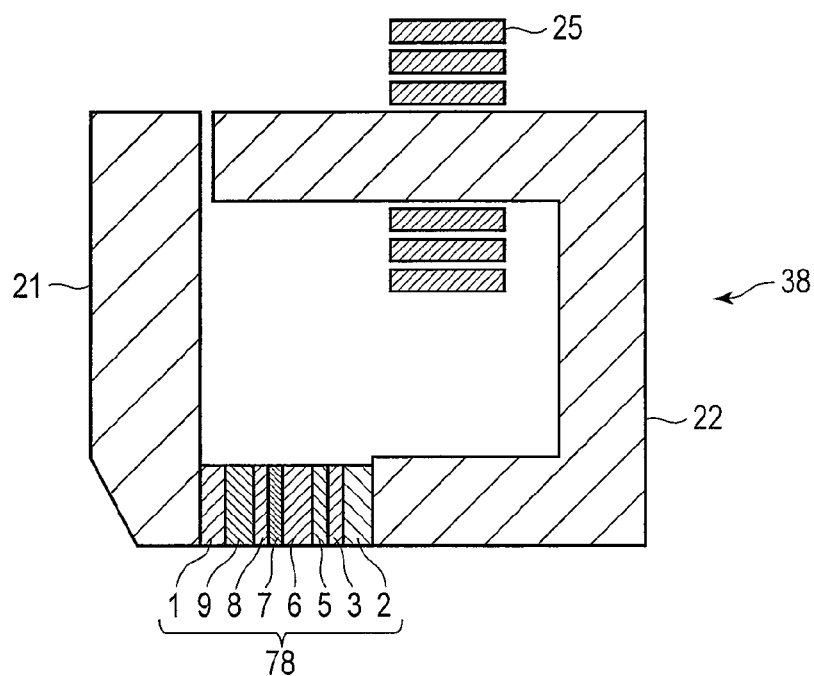
FIG. 14 is a schematic view showing an example of a magnetic head according to an embodiment.

The magnetic recording head 38 shown in FIG. 14 is structured the same as the magnetic recording head 31 in FIG. 7 except that, in comparison to the spin torque oscillator 71 in FIG. 7, the spin torque oscillator 78 in FIG. 14 includes the first perpendicular magnetic film 2 between the first interface magnetic layer 3 and the auxiliary magnetic pole 22, and includes the second perpendicular magnetic film 9 and the base layer 1 between the second interface magnetic layer 8 and the main magnetic pole 21.

Figure 15:
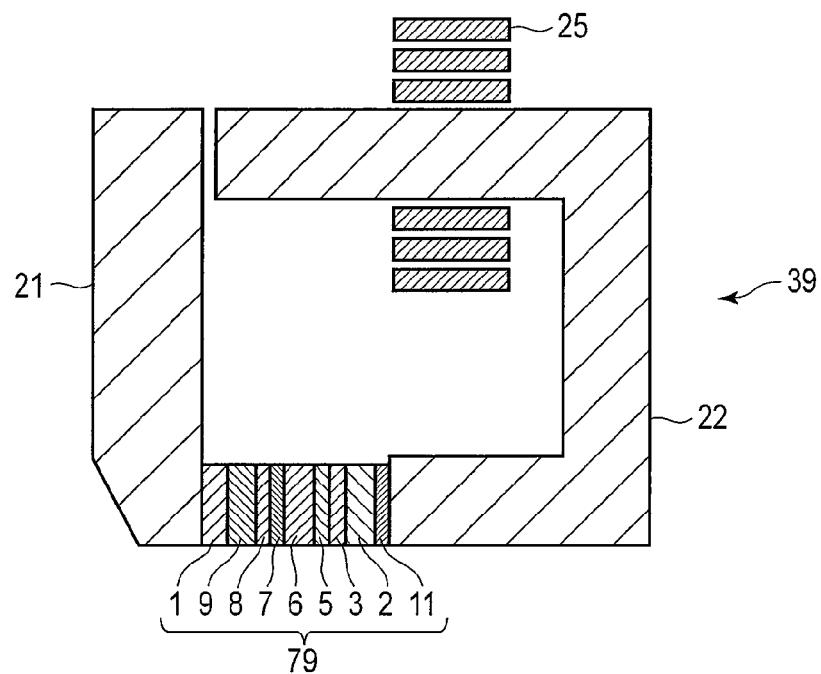
FIG. 15 is a schematic view showing an example of a magnetic head according to an embodiment.

The magnetic recording head 39 shown in FIG. 15 is structured the same as the magnetic recording head 31 in FIG. 7 except that, in comparison to the spin torque oscillator 71 in FIG. 7, the spin torque oscillator 79 in FIG. 15 includes the first perpendicular magnetic film 2 and the cap layer 11 between the first interface magnetic layer 3 and the auxiliary magnetic pole 22, and includes the second perpendicular magnetic film 9 and the base layer 1 between the second interface magnetic layer 8 and the main magnetic pole 21.

As shown in FIGS. 8 to 15, when the first interface magnetic layer is laminated with the first perpendicular magnetic film, the magnetization of the first interface magnetic layer is much firmly pinned to a perpendicular direction to their surfaces, and consequently, they function as a film having good spin injection performance. The first perpendicular magnetic film may be formed directly on the main magnetic pole, or may be formed on the main magnetic pole with a suitable underlying material interposed therebetween for better anisotropy. Similarly, when the second interface magnetic layer is laminated with the second perpendicular magnetic film, the magnetization of the second interface magnetic layer is pinned to a perpendicular direction to their surfaces. Thereby, the magnetization of the second interface magnetic layer is much firmly pinned to the perpendicular direction to their surfaces and they function as a film having good spin injection performance. The auxiliary magnetic pole may be formed directly on the second perpendicular magnetic film, or may be formed on the second perpendicular magnetic film with a cap layer interposed therebetween.

Furthermore, when the lamination order is changed as shown in FIGS. 16 to 25, the second interface magnetic layer configured to apply the negative spin torque to the oscillation layer can be formed at the auxiliary magnetic pole side of the oscillation layer, and the first interface magnetic layer configured to apply the positive spin torque to the oscillation layer can be formed at the main magnetic pole side of the oscillation layer. By changing the lamination order in the spin torque oscillator suitably, the perpendicular magnetic anisotropy of the first perpendicular magnetic film or of the second perpendicular magnetic film can be increased.

Figure 16:
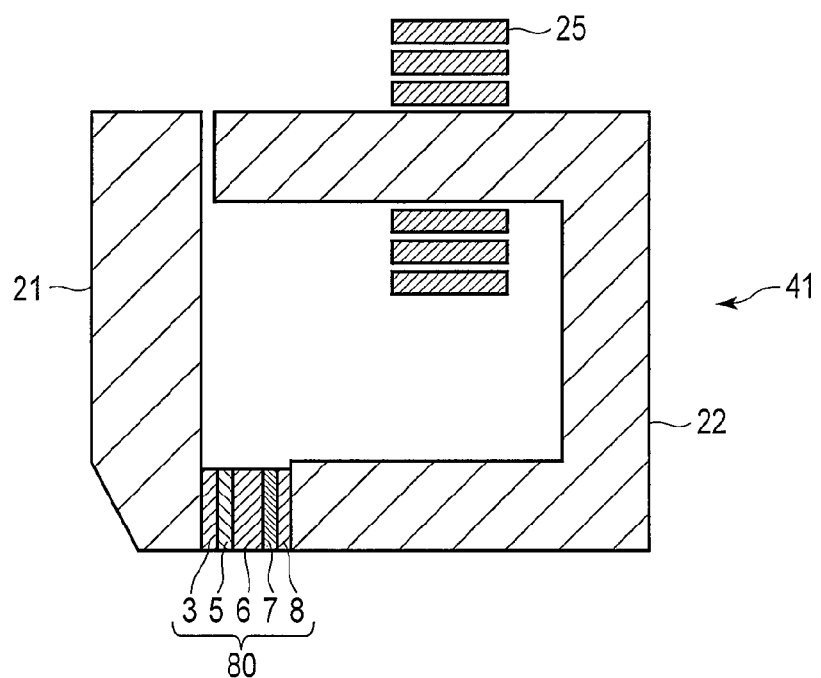
FIG. 16 is a schematic view showing an example of a magnetic head according to an embodiment.

The magnetic recording head 41 shown in FIG. 16 is structured basically the same as the magnetic recording head 31 shown in FIG. 7 except that the spin torque oscillator 80 shown in FIG. 16 has the lamination order reverse to that of the spin torque oscillator 71 shown in FIG. 7.

Figure 17:
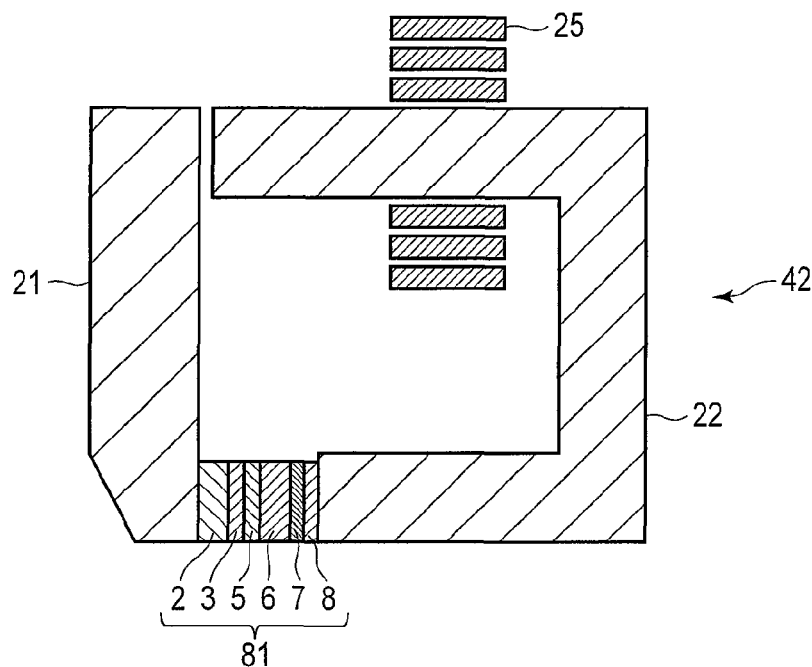
FIG. 17 is a schematic view showing an example of a magnetic head according to an embodiment.

The magnetic recording head 42 shown in FIG. 17 is structured basically the same as that shown in FIG. 8 except that the spin torque oscillator 81 shown in FIG. 17 has the lamination order reverse to that of the spin torque oscillator 72 shown in FIG. 8.

Figure 18:
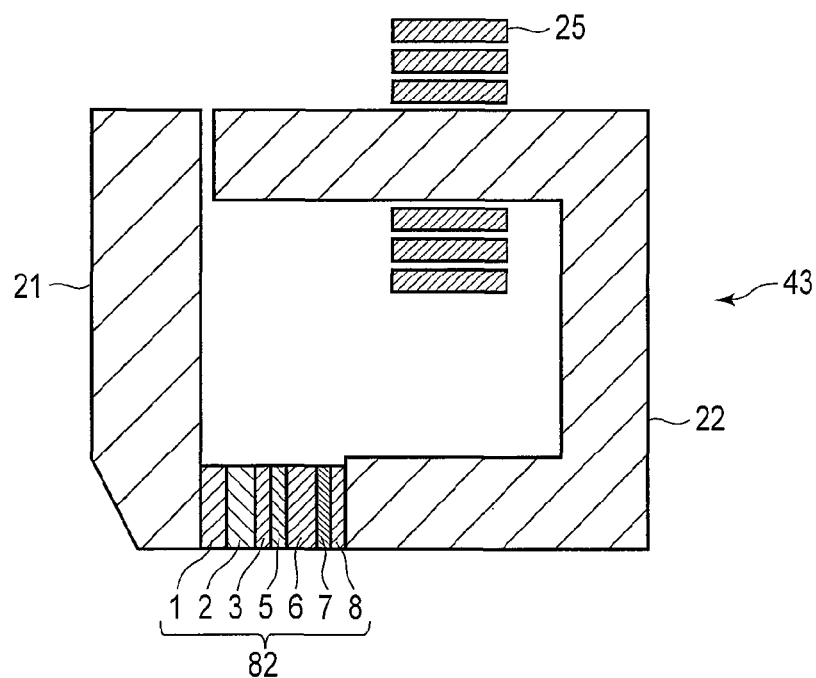
FIG. 18 is a schematic view showing an example of a magnetic head according to an embodiment.

The magnetic recording head 43 shown in FIG. 18 is structured basically the same as that shown in FIG. 9 except that the spin torque oscillator 82 shown in FIG. 18 has the lamination order reverse to that of the spin torque oscillator 73 shown in FIG. 9, and therein the base layer 1 is provided instead of the cap layer 11.

Figure 19:
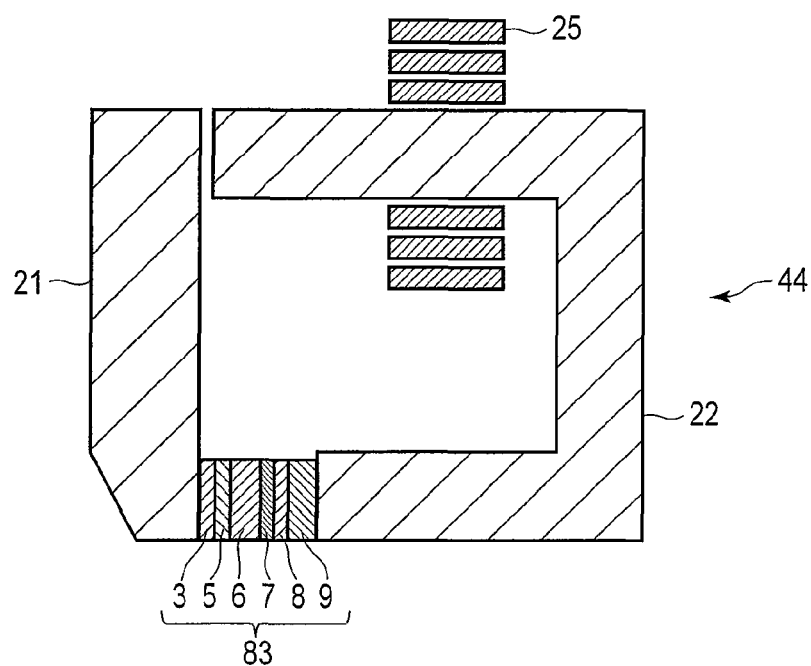
FIG. 19 is a schematic view showing an example of a magnetic head according to an embodiment.

The magnetic recording head 44 shown in FIG. 19 is structured basically the same as basically the same as that shown in FIG. 10 except that the spin torque oscillator 83 shown in FIG. 19 has the lamination order reverse to that of the spin torque oscillator 74 shown in FIG. 10.

Figure 20:
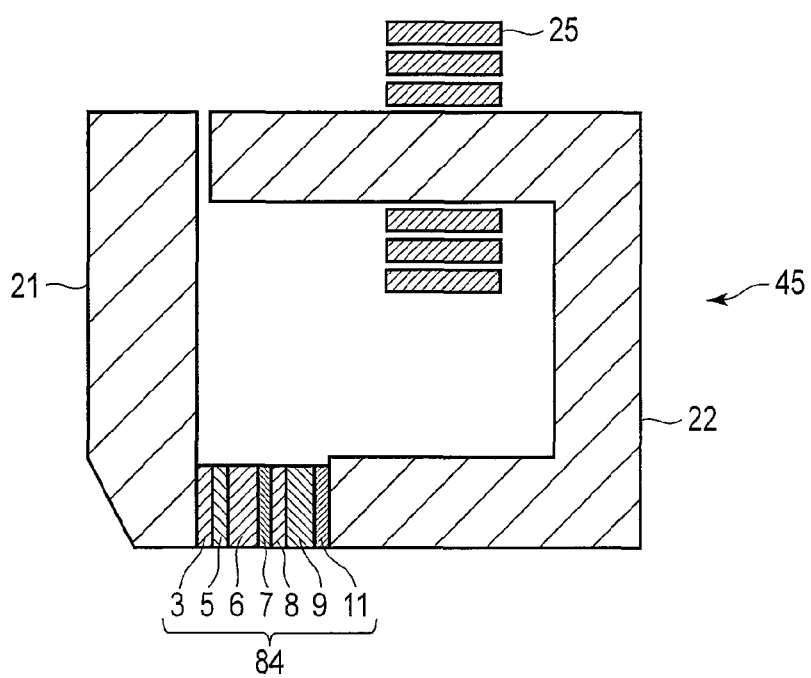
FIG. 20 is a schematic view showing an example of a magnetic head according to an embodiment.

The magnetic recording head 45 shown in FIG. 20 is structured basically the same as that shown in FIG. 11 except that the spin torque oscillator 84 shown in FIG. 20 has the lamination order reverse to that of the spin torque oscillator 75 shown in FIG. 11, and therein the cap layer 11 is provided instead of the base layer 1.

The magnetic recording head 46 shown in FIG. 21 is structured basically the same as basically the same as that shown in FIG. 12 except that the spin torque oscillator 85 shown in FIG. 21 has the lamination order reverse to that of the spin torque oscillator 76 shown in FIG. 12.

The magnetic recording head 47 shown in FIG. 22 is structured basically the same as that shown in FIG. 14 except that the spin torque oscillator 86 shown in FIG. 22 has the lamination order reverse to that of the spin torque oscillator 78 shown in FIG. 14, and therein the cap layer 11 is provided instead of the base layer 1.

Figure 23:
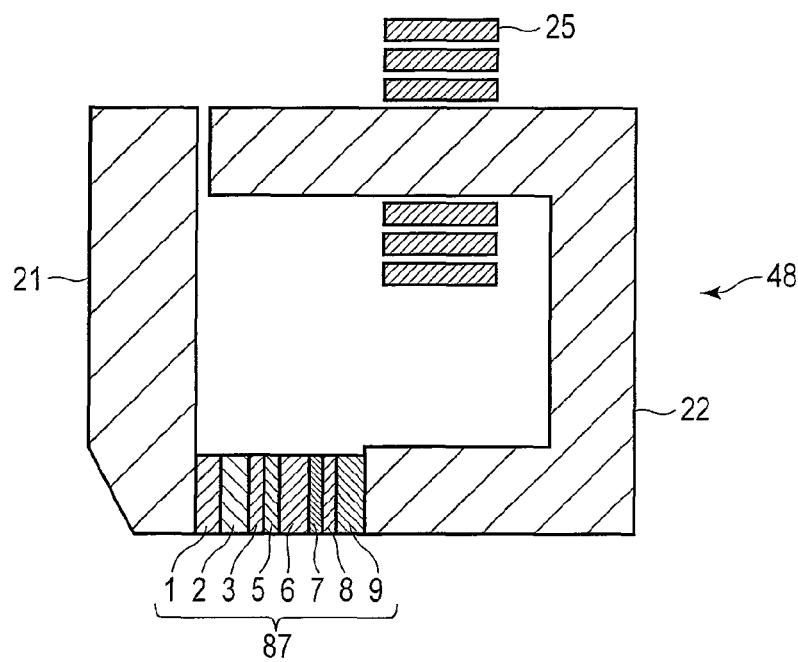
FIG. 23 is a schematic view showing an example of a magnetic head according to an embodiment.

The magnetic recording head 48 shown in FIG. 23 is structured basically the same as that shown in FIG. 13 except that the spin torque oscillator 87 shown in FIG. 23 has the lamination order reverse to that of the spin torque oscillator 77 shown in FIG. 13, and therein the cap layer 11 is provided instead of the base layer 1.

Figure 24:
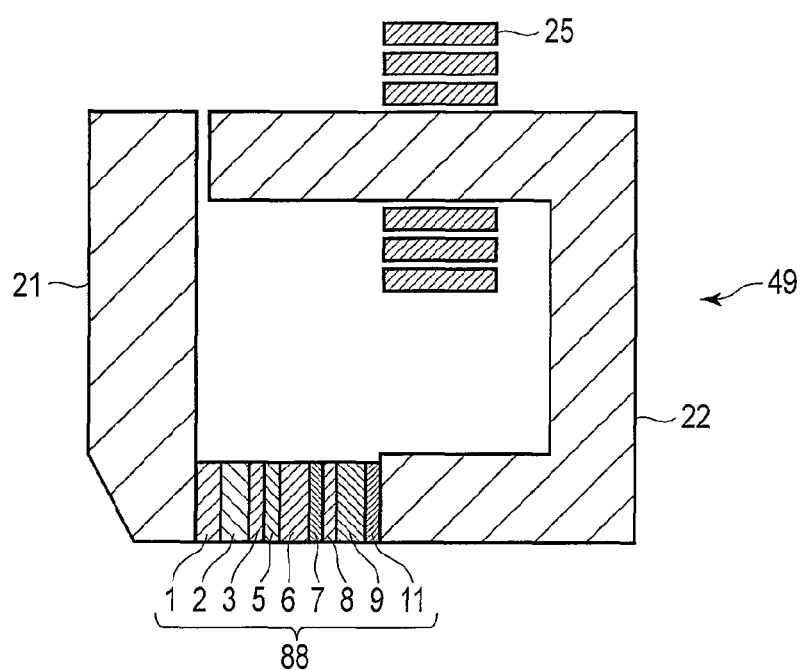
FIG. 24 is a schematic view showing an example of a magnetic head according to an embodiment.

The magnetic recording head 49 shown in FIG. 24 is structured basically the same as that shown in FIG. 15 except that the spin torque oscillator 88 shown in FIG. 24 has the lamination order reverse to that of the spin torque oscillator 79 shown in FIG. 15, and therein the cap layer 11 is provided instead of the base layer 1.

The magnetic recording head of the eighth embodiment comprises a main magnetic pole configured to apply a recording magnetic field into a magnetic recording medium, an auxiliary magnetic pole configuring a magnetic circuit in conjunction with the main magnetic pole, and a spin torque oscillator provided between the main magnetic pole and the auxiliary magnetic pole.

The spin torque oscillator used in the eighth embodiment comprises a downspin injection layer, first interlayer formed on the downspin injection layer, oscillation layer formed on the first interlayer, second interlayer formed on the oscillation layer, and cap layer formed on the oscillation layer instead of the upspin injection layer.

The downspin injection layer used in the eighth embodiment comprises a first perpendicular magnetic layer formed on either the main magnetic pole or the auxiliary magnetic pole, and a first interface magnetic layer formed on the first perpendicular magnetic film. The upspin injection layer used in the seventh embodiment comprises the second interface magnetic layer.

Figure 25:
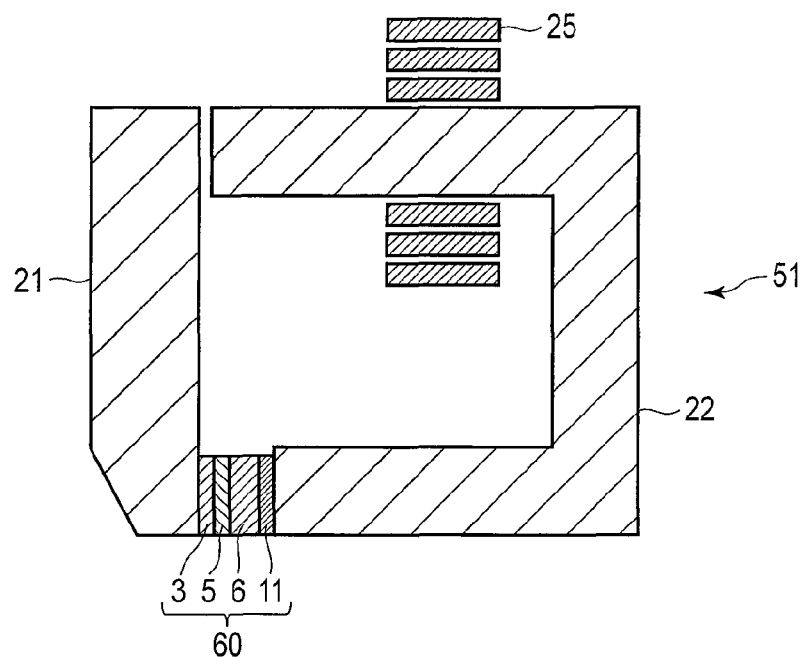
FIG. 25 is a schematic view showing an example of a magnetic head according to an embodiment.

FIG. 25 is a schematic sectional view showing an example of the write head including the spin torque oscillator of the seventh embodiment.

The spin torque oscillator 60 shown in FIG. 25 has a layered structure to be provided between the main magnetic pole 21 which is a lower electrode and the auxiliary magnetic pole 22 which is an upper electrode, and has a single spin injection layer structure. In the spin torque oscillator 60, a first interface magnetic layer 3 is formed on a main magnetic pole 21, an interlayer 5 is formed on the first interface magnetic layer 3, an oscillation layer 6 is formed on the interlayer 5, and a cap layer 11 is formed on the oscillation layer 6. The first interface magnetic layer 3 is made of materials to give a negative spin torque such as FeCr, FeV, FeTi, CoCr, CoMn, NiCr, NiV, and NiTi. Such materials exert a negative magnetoresistance MR. That is, when the film thickness of the first interface magnetic layer is selected appropriately, the resistance of the spin torque oscillator 60 becomes smaller when the magnetization of the spin injection layer and the magnetization of the oscillation layer are in an antiparallel state than when they are in a parallel state.

When current is supplied to the excitation coil, the magnetization near to the first interface magnetic layer 3 of the main magnetic pole 21, the magnetization of the first interface magnetic layer 3, and the magnetization of the oscillation layer 6 become parallel with each other facing the perpendicular direction to the film surface of the spin torque oscillator 60. Here, when current is supplied to the spin torque oscillator 60, the oscillation layer 6 oscillates in a current-carrying direction in which electron passes the first interface magnetic layer 3 formed of the materials to apply the negative spin torque to the oscillation layer. In contrast, if the interface magnetic layer is formed of conventionally-used materials to apply the positive spin torque to the oscillation layer, the oscillation layer 6 then oscillates in a current-carrying direction in which electron reflects upon the first interface magnetic layer 3. With this structural difference, the spin torque oscillator 60 of the present embodiment effectively oscillates at lower voltage than that used in a conventional oscillator which does not have the first interface magnetic layer of the present embodiment but an interface magnetic layer formed of materials to apply the positive spin torque to the oscillation layer.

Figure 26:
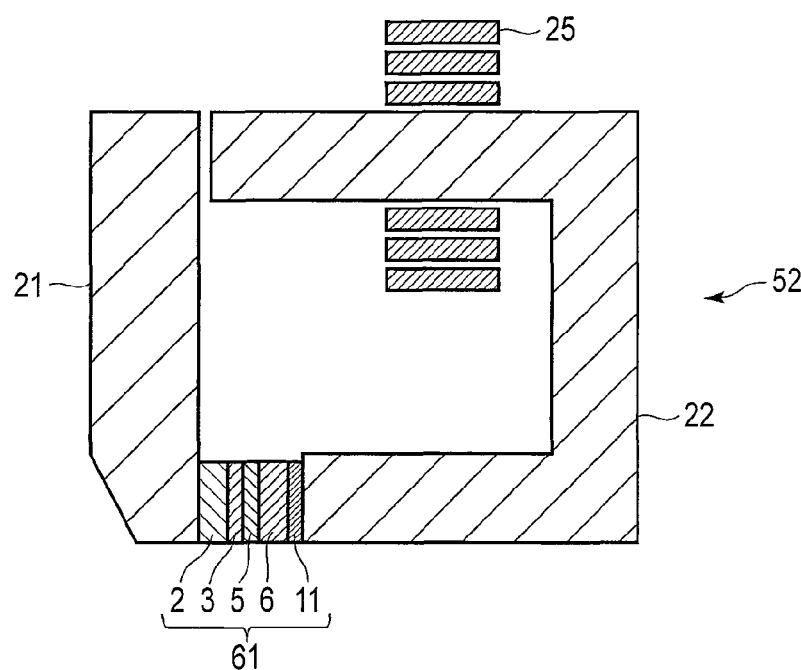
FIG. 26 is a schematic view showing an example of a magnetic head according to an embodiment.

Note that, as shown in FIG. 26, a perpendicular magnetic film 2 may be interposed between the first interface magnetic layer 3 and the main magnetic pole 21 while the other structures are maintained as in FIG. 25. When the first interface magnetic layer is laminated with the perpendicular magnetic film 2, the magnetization of the first interface magnetic layer 3 is much firmly pinned to a perpendicular direction to their surfaces, and consequently, they function as a film having good spin injection performance. Furthermore, as shown in FIG. 27, the perpendicular magnetic film 2 and the base layer 1 may be interposed between the first interface magnetic layer 3 and the main magnetic pole 21 while the other structures are maintained as in FIG. 25. Thereby, the greater anisotropy can be provided by the perpendicular magnetic film 2.

Note that the first interface magnetic layer, second interface magnetic layer, first perpendicular magnetic film, second perpendicular magnetic film, oscillation layer, first interlayer, and second interlayer used in both seventh and eighth embodiments are the same as those in the first and second embodiments.

EXAMPLES

The embodiments will be explained in more detail below by way of its examples.

Example 1

A spin torque oscillator having structure 1 below was manufactured.

First, layers from an underlayer to a cap layer were formed on an electrode in the following order by using the following materials. The deposition method was DC magnetron sputtering, and the back pressure of deposition was $1 \times 10^{-6}$ Pa. After that, another electrode was formed.

Note that in the following description, an expression such as "[Co 0.4 nm/Pt 0.3 nm]*15 layers" means that a multilayered film including 0.4 nm-thick Co and 0.3-nm thick Pt was repetitively stacked 15 times.

Structure 1:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer $Ni_{95}Cr_5$ 3 nm
1st interlayer Cu 3 nm
Oscillation layer [$Fe_{50}Co_{50}$ 1.6 nm/Ni 0.2 nm]*8 layers
2nd interlayer Cu 3 nm
2nd interface magnetic layer $Fe_{50}Co_{50}$ 0.4 nm
2nd perpendicular magnetization film [Co 0.6 nm/Ni 0.2 nm]*15 layers
Cap layer Ru 5 nm
Electrode Ta 5 nm/Au 100 nm Comparative Example 1

For comparison, a spin torque oscillator having structure 2 below was manufactured following the same procedure as in Example 1.

Structure 2:
Electrode Ta 5 nm/Cu 250 nm/Ta 35 nm
Underlayer Ta 3 nm/Pt 2 nm
Perpendicular magnetization film [Co 0.6 nm/Ni 0.2 nm]*15 layers
Interface magnetic layer $Fe_{50}Co_{50}$ 0.4 nm
Interlayer Cu 3 nm
Oscillation layer [$Fe_{50}Co_{50}$ 1.6 nm/Ni 0.2 nm]*8 layers
Cap layer Ru 5 nm
Electrode Ta 5 nm/Au 100 nm
Structure 2 described above was not a double spin transfer layer structure because no transmission-type spin transfer layer was formed.

Comparative Example 2

In addition, a spin torque oscillator having structure 3 below was manufactured as Comparative Example 2 following the same procedure as in Example 1. Structure 3:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer Ni 3 nm
1st interlayer Cu 3 nm
Oscillation layer [$Fe_{50}Co_{50}$ 1.6 nm/Ni 0.2 nm]*8 layers
2nd interlayer Cu 3 nm
2nd interface magnetic layer $Fe_{50}Co_{50}$ 0.4 nm
2nd perpendicular magnetization film [Co 0.6 nm/Ni 0.2 nm]*15 layers
Cap layer Ru 15 nm
Electrode Ta 5 nm/Au 100 nm
In structure 3 described above, the first interface magnetic layer included only a 3-nm thick Ni layer and did not contain two predetermined components.

The element size was 50 nm square. The oscillation start voltage was measured by applying a voltage to a maximum of 200 mV. Consequently, the oscillation start voltage was 10 mV in structure 2 having no double spin transfer structure and 5 mV in structure 1, but structure 3 including the first interface magnetic layer different from that of the embodiment did not oscillate.

Table 1 (to be presented later) shows the results of conversion from the oscillation start voltage to the critical current density.

As shown in Table 1, the critical current density was $1.3*10^7$ A/cm$^2$ in structure 2, $0.6*10^7$ A/cm$^2$ in structure 1, and $2.7*10^8$ A/cm$^2$ or more in structure 3.

As described above, the example of the present invention was able to reduce the critical current density.

The Cr addition amount of NiCr in the first interface magnetic layer can be 1 to 10 at %. When the content of the Cr element is less than 1 at % and/or the content of the Ni element exceeds 99 at %, the layer functions as a reflection-type spin transfer layer instead of a transmission-type spin transfer layer. When the Ni content is less than 90 at % and/or the content of the Cr element exceeds 10 at %, NiCr becomes nonmagnetic and forms a spin scatterer having no spin transfer ability, and the first perpendicular magnetization film functions as a reflection-type spin transfer layer.

Table 2 (to be presented later) shows the dependence of the critical current density on the Cr concentration when NiCr was used as the first interface magnetic layer and the film thickness was fixed to 10 nm.

The critical current density was $2.7*10^8$ A/cm$^2$ or more at a Cr concentration of 0.5 at %, $0.6*10^7$ A/cm$^2$ at 2 at %, $1.3*10^7$ A/cm$^2$ at 3 at %, and $2.7*10^8$ A/cm$^2$ or more at 30 at %. A Cr concentration of 2 at % was optimum, and the critical current density reduced compared to the conventional structures. When the Cr concentration was 0.5 at %, the critical current density increased perhaps because the layer did not function as a transmission-type spin transfer layer. When the Cr concentration was 3 at %, the critical current density increased probably because the exchange stiffness of the film decreased. When the Cr concentration was 30 at %, the critical current density increased presumably because the layer did not function as a transmission-type spin transfer layer.

Table 3 (to be presented later) shows the dependence of the critical current density on the Cr concentration when NiCr was used as the first interface magnetic layer and the film thickness was fixed to 3 nm.

The critical current density was $2.7*10^8$ A/cm$^2$ or more at Cr concentrations of 0.5 and 2.5 at %, $0.6*10^7$ A/cm$^2$ at 5 at %, $1.3*10^7$ A/cm$^2$ at 8 at %, and $2.7*10^8$ A/cm$^2$ or more at 30 at %. A Cr concentration of 5 at % was optimum, and the critical current density reduced compared to the conventional structures. The mechanism of increasing the critical current density when the Cr concentrations were 0.5 and 30 at % was the same as that when the film thickness was 10 nm. When the Cr concentration was 2.5 at %, the critical current density increased perhaps because the film thickness was insufficient and the layer did not function as a transmission-type spin transfer layer. When the Cr concentration was 8 at %, the critical current density increased probably because the exchange stiffness of the film decreased.

As described above, it was possible to reduce the critical current density by properly selecting the film thickness and Cr concentration.

Example 2

In this example, a spin torque oscillator having structure 4 below was manufactured.

First, layers from an underlayer to a cap layer were formed on an electrode by using the following materials. The deposition method was DC magnetron sputtering, and the back pressure of deposition was $1\times10^{-6}$ Pa. After that, an upper electrode was formed.

Structure 4:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer $Fe_{70}Cr_{30}$ 3 nm
1st interlayer Cu 3 nm
Oscillation layer [$Fe_{50}Co_{50}$ 1.6 nm/Ni 0.2 nm]*8 layers
2nd interlayer Cu 3 nm
2nd interface magnetic layer $Fe_{50}Co_{50}$ 0.4 nm
2nd perpendicular magnetization film [Co 0.6 nm/Ni 0.2 nm]*15 layers
Cap layer Ru 15 nm
Electrode Ta 5 nm/Au 100 nm Comparative Example 3

In addition, a spin torque oscillator having structure 5 below was manufactured as a comparative example following the same procedure as in Example 1.

Structure 5:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer Fe 3 nm
1st interlayer Cu 3 nm
Oscillation layer [$Fe_{50}Co_{50}$ 1.6 nm/Ni 0.2 nm]*8 layers
2nd interlayer Cu 3 nm
2nd interface magnetic layer $Fe_{50}Co_{50}$ 0.4 nm
2nd perpendicular magnetization film [Co 0.6 nm/Ni 0.2 nm]*15 layers
Cap layer Ru 15 nm
Electrode Ta 5 nm/Au 100 nm The element size was 50 nm square. The oscillation start voltage was measured by applying a voltage to a maximum of 200 mV. Consequently, the oscillation start voltage was 5 mV in structure 4, but structure 5 including the first interface magnetic layer containing only Fe did not oscillate. As shown in Table 1, the critical current density was $0.6*10^7$ A/cm$^2$ in structure 4, and $2.7*10^8$ A/cm$^2$ or more in structure 5. As described above, this example was able to reduce the critical current density.

The Cr addition amount of NiCr can be 1 to 80 at %. When the content of the Cr element is less than 1 at % and/or the content of Fe exceeds 99 at %, the layer functions as an reflection-type spin transfer layer instead of a transmission-type spin transfer layer. When the content of Fe is less than 20 at % and/or the content of the Cr element exceeds 80 at %, FeCr becomes nonmagnetic and forms a spin scatterer having no spin transfer ability, and the first perpendicular magnetization film functions as an reflection-type spin transfer layer.

Table 3 (to be presented later) shows the dependence of the critical current density on the Cr concentration when the film thickness of FeCr was fixed to 3 nm.

The critical current density was $2.7*10^8$ A/cm$^2$ or more at a Cr concentration of 10 at %, $0.6*10^7$ A/cm$^2$ at 30 at %, and $1.0*10^7$ A/cm$^2$ at 60 at %. The mechanism was the same as that of Example 1. As described above, it was possible to reduce the critical current density by properly selecting the film thickness and Cr concentration.

Example 3

A spin torque oscillator having structure 6 below was manufactured.

First, layers from an underlayer to a cap layer were formed on an electrode by using the following materials. The deposition method was DC magnetron sputtering, and the back pressure of deposition was $1\times10^{-6}$ Pa. After that, an upper electrode was formed.
Structure 6:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer $Fe_{75}V_{25}$ 4 nm
1st interlayer Cu 3 nm
Oscillation layer [$Fe_{50}Co_{50}$ 1.6 nm/Ni 0.2 nm]*8 layers
2nd interlayer Cu 3 nm
2nd interface magnetic layer $Fe_{50}Co_{50}$ 0.4 nm
2nd perpendicular magnetization film [Co 0.6 nm/Ni 0.2 nm]*15 layers
Cap layer Ru 15 nm
Electrode Ta 5 nm/Au 100 nm The element size was 50 nm square. The oscillation start voltage was measured by applying a voltage to a maximum of 200 mV. Consequently, structure 6 oscillated.

As shown in Table 1, the critical current density was $0.6*10^7$ A/cm$^2$ in structure 6. As described above, this example was able to reduce the critical current density.

The V addition amount of FeV can be 1 to 65 at %. When the content of the V element is less than 1 at % and/or the content of Fe exceeds 99 at %, the layer functions as a reflection-type spin transfer layer instead of a transmission-type spin transfer layer. When the content of Fe is less than 35 at % and/or the content of the V element exceeds 65 at %, FeV becomes nonmagnetic and forms a spin scatterer having no spin transfer ability, and the first perpendicular magnetization film functions as a reflection-type spin transfer layer. Table 4 shows the dependence of the critical current density on the Cr concentration when the film thickness was fixed to 4 nm. The critical current density was $2.7*10^8$ A/cm$^2$ or more at a V concentration of 15 at %, $0.6*10^7$ A/cm$^2$ at 25 at %, and $1.0*10^7$ A/cm$^2$ at 50 at %. The mechanism was the same as that of Example 1. As described above, it was possible to reduce the critical current density by properly selecting the film thickness and V concentration.

Example 4

A spin torque oscillator according to the first embodiment was manufactured.

First, layers from an underlayer to a cap layer were formed on an electrode in the following order by using the following materials. The deposition method was DC magnetron sputtering, and the back pressure of deposition was $1\times10^{-6}$ Pa. After that, another electrode was formed.

The following structure was different from Example 1 in that no second interface magnetic layer was formed.
Structure 7:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer $Fe_{70}Cr_{30}$ 3 nm
1st interlayer Cu 3 nm
Oscillation layer [$Fe_{50}Co_{50}$ 1.6 nm/Ni 0.2 nm]*8 layers
2nd interlayer Cu 3 nm
2nd perpendicular magnetization film [Co 0.6 nm/Ni 0.2 nm]*15 layers
Cap layer Ru 5 nm
Electrode Ta 5 nm/Au 100 nm

Comparative Example 4

For comparison, a spin torque oscillator having structure 8 below was manufactured following the same procedure as above.
Structure 8:
Electrode Ta 5 nm/Cu 250 nm/Ta 35 nm
Underlayer Ta 3 nm/Pt 2 nm
Perpendicular magnetization film [Co 0.6 nm/Ni 0.2 nm]*15 layers
Interlayer Cu 3 nm
Oscillation layer [$Fe_{50}Co_{50}$ 1.6 nm/Ni 0.2 nm]*8 layers
Cap layer Ru 5 nm
Electrode Ta 5 nm/Au 100 nm Structure 8 described above was not a double spin transfer layer structure because no transmission-type spin transfer layer was formed.

Comparative Example 5

In addition, a spin torque oscillator having structure 9 below was manufactured as Comparative Example 5 following the same procedure as above.
Structure 9:
Electrode Ta 5 nm/Cu 250 nm/Ta 35 nm
Underlayer Ta 3 nm/Pt 2 nm
1st perpendicular magnetization film [Co 0.4 nm/Pt 0.3 nm]*15 layers
1st interface magnetic layer Fe 3 nm
1st interlayer Cu 3 nm
Oscillation layer [$Fe_{50}Co_{50}$ 1.6 nm/Ni 0.2 nm]*8 layers
2nd interlayer Cu 3 nm
2nd perpendicular magnetization film [Co 0.6 nm/Ni 0.2 nm]*15 layers
Cap layer Ru 15 nm
Electrode Ta 5 nm/Au 100 nm In structure 9 described above, the first interface magnetic layer included only a 3-nm thick Fe layer and did not contain two predetermined components.

The element size was 50 nm square. The oscillation start voltage was measured by applying a voltage to a maximum of 200 mV. Consequently, the oscillation start voltage was 10 mV in structure 8 having no double spin transfer structure and 5 mV in structure 7, but structure 9 including the first interface magnetic layer different from that of the embodiment did not oscillate.

Table 1 below shows the results of conversion from the oscillation start voltage to the critical current density.

As shown in Table 1, the critical current density was $1.3*10^7$ A/cm$^2$ in structure 8, $0.6*10^7$ A/cm$^2$ in structure 7, and $2.7*10^8$ A/cm$^2$ or more in structure 9.

As described above, the example of the present invention was able to reduce the critical current density.

TABLE 1

|  | Critical current density ($10^7$ A/cm$^2$) |
|---|---|
| Structure 1 | 0.6 |
| Structure 2 | 1.3 |
| Structure 3 | 27 or more |

TABLE 1-continued

| | Critical current density ($10^7 A/cm^2$) |
|---|---|
| Structure 4 | 0.6 |
| Structure 5 | 27 or more |
| Structure 6 | 0.6 |
| Structure 7 | 0.6 |
| Structure 8 | 1.3 |
| Structure 9 | 27 or more |

TABLE 2

| | | Critical current density ($10^7 A/cm^2$) |
|---|---|---|
| Cr concentration (at %) of NiCr | 30 | 27 or more |
| | 3 | 1.3 |
| | 2 | 0.6 |
| | 0.5 | 27 or more |

TABLE 3

| | | Critical current density ($10^7 A/cm^2$) |
|---|---|---|
| Cr concentration (at %) of NiCr | 30 | 27 or more |
| | 8 | 1.3 |
| | 5 | 0.6 |
| | 2.5 | 27 or more |
| | 0.5 | 27 or more |
| Cr concentration (at %) of FeCr | 70 | 27 or more |
| | 60 | 1.3 |
| | 30 | 0.6 |
| | 10 | 27 or more |
| | 0.5 | 27 or more |

TABLE 4

| | | Critical current density ($10^7 A/cm^2$) |
|---|---|---|
| V concentration (at %) of FeV | 70 | 27 or more |
| | 50 | 1.3 |
| | 25 | 0.6 |
| | 15 | 27 or more |
| | 0.5 | 27 or more |

Example 5

In this example, a magnetic recording head comprising a spin torque oscillator was manufactured as follows.

First, layers from a first interface magnetic layer to a cap layer were formed on a main magnetic pole by using the following materials in accordance with Structure 10. The deposition method was DC magnetron sputtering with the back pressure of deposition was $1 \times 10^{-6}$ Pa. After that, a spin torque oscillator was processed into an element whose size is 30 nm square to 50 nm square, the cap layer was removed by sputter etching, and an auxiliary magnetic pole was formed thereon. Consequently, the magnetic recording head having the same structure as in FIG. 7 was manufactured.
Structure 10:
Main magnetic pole
1st interface magnetic layer: $Co_{72}Fe_8B_{20}$ 2 nm/$Fe_{50}Co_{50}$ 0.5 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 3 nm
2nd interface magnetic layer: $Fe_{70}Cr_{30}$ 4 nm
Cap layer: Ru 15 nm
(Ru 15 nm removed by sputter etching)
Auxiliary magnetic pole Comparative Example 6

For comparison, a spin torque oscillator having Structure 11 below was manufactured following the procedure of Example 5.
Structure 11:
Main magnetic pole
1st interface magnetic layer: $Co_{72}Fe_8B_{20}$ 2 nm/$Fe_{50}Co_{50}$ 0.5 nm
1st interlayer: Cu 3 nm
Oscillation layer: [$Fe_{50}Co_{50}$ 1.6 nm/Ni 0.2 nm]*8 layers
Cap layer: Ru 21 nm
(Ru 15 nm removed by sputter etching)
Auxiliary magnetic pole
Structure 10 of Example 5 requires the critical current density for oscillation less than that is required in Comparative Example 6.

Example 6

Using Structure 12 below, a magnetic recording head having the same structure as in FIG. 8 was manufactured following the procedure of Example 5.
Structure 12:
Main magnetic pole
1st interface magnetic layer: $Co_{72}Fe_8B_{20}$ 2 nm/$Fe_{50}Co_{50}$ 0.5 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 1 nm
2nd interface magnetic layer: $Fe_{70}Cr_{30}$ 2 nm
2nd perpendicular magnetic film: [Co 0.4 nm/Pt 0.3 nm]*15 layers
Cap layer: Ru 15 nm
(Ru 15 nm removed by sputter etching)
Auxiliary magnetic pole
Structure 12 of Example 6 requires the critical current density for oscillation less than that is required in Comparative Example 6.

Example 7

Using Structure 13 below, a magnetic recording head having the same structure as in FIG. 9 was manufactured following the procedure of Example 5.
Structure 13:
Main magnetic pole
1st interface magnetic layer: $Co_{72}Fe_8B_{20}$ 2 nm/$Fe_{50}Co_{50}$ 0.5 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 1 nm
2nd interface magnetic layer: $Fe_{70}Cr_{30}$ 2 nm
2nd perpendicular magnetic film: [Co 0.4 nm/Pt 0.3 nm]*15 layers
Cap layer: Ru 15 nm
Auxiliary magnetic pole
Structure 13 of Example 7 requires the critical current density for oscillation less than that is required in Comparative Example 6.

Example 8

Using Structure 14 below, a magnetic recording head having the same structure as in FIG. 10 was manufactured following the procedure of Example 5.
Structure 14:
Main magnetic pole
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 3 nm
2nd interface magnetic layer: $Fe_{70}Cr_{30}$ 4 nm/Cap layer: Ru 15 nm
(Ru 15 nm removed by sputter etching)
Auxiliary magnetic pole Structure 14 of Example 8 requires the critical current density for oscillation less than that is required in Comparative Example 1.

Example 9

Using Structure 15 below, a magnetic recording head having the same structure as in FIG. 11 was manufactured following the procedure of Example 5.
Structure 15:
Main magnetic pole
Base layer: Ta 3 nm/Pt 2 nm
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 3 nm
2nd interface magnetic layer: $Fe_{70}Cr_{30}$ 4 nm
Cap layer: Ru 15 nm
(Ru 15 nm removed by sputter etching)
Auxiliary magnetic pole

Comparative Example 7

For comparison, a magnetic recording head having Structure 16 below was manufactured following the procedure of Example 5.
Structure 16:
Main magnetic pole
Base layer: Ta 3 nm/Pt 2 nm
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
Cap layer: Ru 21 nm
(Ru 15 nm removed by sputter etching)
Auxiliary magnetic pole Structure 16 of Comparative Example 7 requires the critical current density for oscillation less than that is required in Comparative Example 2.

Example 10

Using Structure 17 below, a magnetic recording head having the same structure as in FIG. 12 was manufactured following the procedure of Example 5.
Structure 17:
Main magnetic pole
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 1 nm
2nd interface magnetic layer: $Fe_{70}Cr_{30}$ 2 nm
2nd perpendicular magnetic film: [Co 0.4 nm/Pt 0.3 nm]*15 layers
Cap layer: Ru 15 nm
(Ru 15 nm removed by sputter etching)
Auxiliary magnetic pole Structure 17 of Example 10 requires the critical current density for oscillation less than that is required in Comparative Example 7.

Example 11

Using Structure 18 below, a magnetic recording head having the same structure as in FIG. 13 was manufactured following the procedure of Example 5.
Structure 18:
Main magnetic pole
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 1 nm
2nd interface magnetic layer: $Fe_{70}Cr_{30}$ 2 nm
2nd perpendicular magnetic film: [Co 0.4 nm/Pt 0.3 nm]*15 layers
Cap layer: Ru 15 nm
Auxiliary magnetic pole Structure 18 of Example 11 requires the critical current density for oscillation less than that is required in Comparative Example 7.

Example 12

Using Structure 19 below, a magnetic recording head having the same structure as in FIG. 14 was manufactured following the procedure of Example 5.
Structure 19:
Main magnetic pole
Base layer: Ta 3 nm/Pt 2 nm
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
2nd interface magnetic layer: $Fe_{70}Cr_{30}$ 2 nm
2nd perpendicular magnetic film: [Co 0.4 nm/Pt 0.3 nm]*15 layers
Cap layer: Ru 15 nm
(Ru 15 nm removed by sputter etching)
Auxiliary magnetic pole Structure 19 of Example 12 requires the critical current density for oscillation less than that is required in Comparative Example 2.

Example 13

Using Structure 20 below, a magnetic recording head having the same structure as in FIG. 15 was manufactured following the procedure of Example 5.

Structure 20:
Main magnetic pole
Base layer: Ta 3 nm/Pt 2 nm
1st perpendicular magnetic film: [Co 0.4 nm/Pt 0.3 nm]*15 layers
1st interface magnetic layer: $Fe_{50}Co_{50}$ 1 nm
1st interlayer: Cu 3 nm
Oscillation layer: [$Fe_{50}Co_{50}$ 1.6 nm/Ni 0.2 nm]*8 layers
2nd interlayer: Cu 3 nm/Cr 2 nm
2nd interface magnetic layer: $Fe_{70}Cr_{30}$ 2 nm
2nd perpendicular magnetic film: [Co 0.4 nm/Pt 0.3 nm]*15 layers
Cap layer: Ru 15 nm
Auxiliary magnetic pole Structure 20 of Example 13 requires the critical current density for oscillation less than that is required in Comparative Example 7.

Example 14

Using Structure 21 below, a magnetic recording head having the same structure as in FIG. 16 was manufactured following the procedure of Example 5.
Structure 21:
Main magnetic pole
2nd interface magnetic layer: $Co_{72}Fe_8B_{20}$ 2 nm/$Fe_{70}Cr_{30}$ 2 nm
2nd interlayer: Cr 1 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Fe_{50}Co_{50}$ 2 nm
Cap layer: Ru 15 nm
(Ru 15 nm removed by sputter etching)
Auxiliary magnetic pole Comparative Example 8

For comparison, a magnetic recording head having Structure 22 below was manufactured following the procedure of Example 5.
Structure 22:
Main magnetic pole
2nd interface magnetic layer: $Co_{72}Fe_8B_{20}$ 2 nm/$Fe_{70}Cr_{30}$ 2 nm
2nd interlayer: Cr 1 nm/Cu 3 nm
Oscillation layer: [$Fe_{50}Co_{50}$ 1.6 nm/Ni 0.2 nm]*8 layers
Cap layer: Ru 15 nm
(Ru 15 nm removed by sputter etching)
Auxiliary magnetic pole Structure 21 of Example 14 requires the critical current density for oscillation less than that is required in Comparative Example 8.

Example 15

Using Structure 23 below, a magnetic recording head having the same structure as in FIG. 17 was manufactured following the procedure of Example 5.
Structure 23:
Main magnetic pole
2nd interface magnetic layer: $Co_{72}Fe_8B_{20}$ 2 nm/$Fe_{70}Cr_{50}$ 2 nm
2nd interlayer: Cr 1 nm/Cu 3 nm
Oscillation layer: $Fe_{47}Co_{47}Al_6$ 15 nm
1st interlayer: Cu 3 nm/Cr 3 nm
1st interface magnetic layer: $Fe_{50}Co_{50}$ 1 nm
1st perpendicular magnetic film: [Co 0.2 nm/Ni 0.6 nm]*15 layers
Cap layer: Ru 15 nm
(Ru 15 nm removed by sputter etching)
Auxiliary magnetic pole Structure 23 of Example 15 requires the critical current density for oscillation less than that is required in Comparative Example 8.

Example 16

Using Structure 24 below, a magnetic recording head having the same structure as in FIG. 18 was manufactured following the procedure of Example 5.
Structure 24:
Main magnetic pole
Base layer: Ta 3 nm/Cu 2 nm
2nd perpendicular magnetic film: [Co 0.2 nm/Ni 0.6 nm]*15 layers
2nd interface magnetic layer: $Ni_{95}Cr_5$ 3 nm
2nd interlayer: Cr 1 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Fe_{50}Co_{50}$ 2 nm
Cap layer: Ru 15 nm
(Ru 15 nm removed by sputter etching)
Auxiliary magnetic pole Comparative Example 9

For comparison, a magnetic recording head having Structure 25 below was manufactured following the procedure of Example 5.
Structure 25:
Main magnetic pole/Base layer: Ta 3 nm/Cu 2 nm
2nd perpendicular magnetic film: [Co 0.2 nm/Ni 0.6 nm]*15 layers
2nd interface magnetic layer: $Ni_{95}Cr_5$ 3 nm
2nd interlayer: Cr 1 nm/Cu 3 nm
Oscillation layer: [$Fe_{50}Co_{50}$ 1.6 nm/Ni 0.2 nm]*8 layers
Cap layer: Ru 18 nm
(Ru 15 nm removed by sputter etching)
Auxiliary magnetic pole Structure 24 of Example 16 requires the critical current density for oscillation less than that is required in Comparative Example 9.

Example 17

Using Structure 26 below, a magnetic recording head having the same structure as in FIG. 19 was manufactured following the procedure of Example 5.
Structure 26:
Main magnetic pole
2nd interface magnetic layer: $Co_{72}Fe_8B_{20}$ 2 nm/$Ni_{95}Cr_5$ 3 nm
2nd interlayer: Cr 1 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Fe_{50}Co_{50}$ 2 nm
Cap layer: Ru 15 nm
(Ru 15 nm removed by sputter etching)
Auxiliary magnetic pole Structure 26 of Example 17 requires the critical current density for oscillation less than that is required in Comparative Example 9.

Example 18

Using Structure 27 below, a magnetic recording head having the same structure as in FIG. 20 was manufactured following the procedure of Example 5.
Structure 27:
Main magnetic pole
2nd interface magnetic layer: $Co_{72}Fe_8B_{20}$ 2 nm/$Fe_{75}V_{25}$ 4 nm
2nd interlayer: Cr 1 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Co_2MnSi$ 2 nm
Cap layer: Ru 15 nm
Auxiliary magnetic pole
Structure 27 of Example 18 requires the critical current density for oscillation less than that is required in Comparative Example 8.

Example 19

Using Structure 28 below, a magnetic recording head having the same structure as in FIG. 21 was manufactured following the procedure of Example 5.
Structure 28:
Main magnetic pole
2nd perpendicular magnetic film: [Co 0.2 nm/Ni 0.6 nm]*15 layers
2nd interface magnetic layer: $Co_{80}Cr_{20}$ 3 nm
2nd interlayer: Cr 1 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Co_2MnSi$ 2 nm
1st perpendicular magnetic film: [Co 0.2 nm/Ni 0.6 nm]*15 layers
Cap layer: Ru 15 nm
(Ru 15 nm removed by sputter etching)
Auxiliary magnetic pole
Structure 28 of Example 19 requires the critical current density for oscillation less than that is required in Comparative Example 8.

Example 20

Using Structure 29 below, a magnetic recording head having the same structure as in FIG. 22 was manufactured following the procedure of Example 5.
Structure 29:
Main magnetic pole
2nd perpendicular magnetic film: [Co 0.2 nm/Ni 0.6 nm]*15 layers
2nd interface magnetic layer: $Ni_{95}V_5$ 4 nm
2nd interlayer: Cr 1 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Fe_{50}Co_{50}$ 1 nm
1st perpendicular magnetic film: [Co 0.2 nm/Ni 0.6 nm]*15 layers
Cap layer: Ru 15 nm
Auxiliary magnetic pole Structure 29 of Example 20 requires the critical current density for oscillation less than that is required in Comparative Example 8.

Example 21

Using Structure 30 below, a magnetic recording head having the same structure as in FIG. 23 was manufactured following the procedure of Example 5.
Structure 30:
Main magnetic pole
Base layer: Ta 3 nm/Cu 2 nm
2nd perpendicular magnetic film: [Co 0.2 nm/Ni 0.6 nm]*15 layers
2nd interface magnetic layer: $Fe_{70}Cr_{50}$ 4 nm
2nd interlayer: Cr 3 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Fe_{50}Co_{50}$ 1 nm
1st perpendicular magnetic film: [Co 0.2 nm/Ni 0.6 nm]*15 layers
Cap layer: Ru 15 nm
(Ru 15 nm removed by sputter etching)
Auxiliary magnetic pole
Structure 30 of Example 21 requires the critical current density for oscillation less than that is required in Comparative Example 4.

Example 22

Using Structure 31 below, a magnetic recording head having the same structure as in FIG. 24 was manufactured following the procedure of Example 5.
Structure 31:
Main magnetic pole
Base layer: Ta 3 nm/Cu 2 nm
2nd perpendicular magnetic film: [Co 0.2 nm/Ni 0.6 nm]*15 layers
2nd interface magnetic layer: $Fe_{70}Cr_{30}$ 4 nm
2nd interlayer: Cr 3 nm/Cu 3 nm
Oscillation layer: [$Fe_{50}Co_{50}$ 1.6 nm/Ni 0.2 nm]*8 layers
1st interlayer: Cu 3 nm
1st interface magnetic layer: $Fe_{50}Co_{50}$ 1 nm
1st perpendicular magnetic film: [Co 0.2 nm/Ni 0.6 nm]*15 layers
Cap layer: Ru 15 nm
Auxiliary magnetic pole
Structure 31 of Example 21 requires the critical current density for oscillation less than that is required in Comparative Example 9.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A magnetic head comprising:
a main magnetic pole configured to apply a recording magnetic field to a recording magnetic medium;
an auxiliary magnetic pole configured to form a magnetic circuit together with the main magnetic pole; and
a spin torque oscillator formed between the main magnetic pole and the auxiliary magnetic pole,
the spin torque oscillator including
a first interface magnetic layer formed on one of the main magnetic pole and the auxiliary magnetic pole, and containing at least one element selected from the group consisting of iron, cobalt, and nickel, and at least one element selected from the group consisting of chromium, vanadium, manganese, titanium, and scandium, a first interlayer formed on the first interface magnetic layer, an oscillation layer formed on the first interlayer, and a cap layer formed on the oscillation layer.

2. The head according to claim 1, wherein the oscillation layer is made of an FeCo alloy, an FeCo alloy with at least one element selected from the group consisting of aluminum, silicon, gallium, germanium, copper, silver, and boron, or cobalt-based Heusler alloy.

3. The head according to claim 1, wherein the first interface magnetic layer is made of materials exerting a negative magnetoresistance effect to an FeCo alloy.

4. The head according to claim 1, wherein the first interface magnetic layer contains nickel and chromium, and a content of the chromium element is 1 to 10 at %.

5. The head according to claim 1, wherein the first interface magnetic layer contains iron and chromium, and a content of the chromium element is 1 to 80 at %.

6. The head according to claim 1, wherein the first interface magnetic layer contains iron and vanadium, and a content of the vanadium element is 1 to 65 at %.

7. A magnetic head assembly comprising:

a magnetic head comprising a main magnetic pole configured to apply a recording magnetic field to a recording magnetic medium, an auxiliary magnetic pole configured to form a magnetic circuit together with the main magnetic pole, and a spin torque oscillator formed between the main magnetic pole and the auxiliary magnetic pole, the spin torque oscillator including a first interface magnetic layer formed on one of the main magnetic pole and the auxiliary magnetic pole, and containing at least one element selected from the group consisting of iron, cobalt, and nickel, and at least one element selected from the group consisting of chromium, vanadium, manganese, titanium, and scandium, a first interlayer formed on the first interface magnetic layer, an oscillation layer formed on the first interlayer, and a cap layer formed on the oscillation layer;

the magnetic head assembly further comprising:

a head slider on which the magnetic head is mounted;

a suspension on one end of which the head slider is mounted; and an actuator arm connected to the other end of the suspension.

8. A magnetic recording/reproducing apparatus, comprising:

a magnetic recording medium;

a main magnetic pole configured to apply a recording magnetic field to a recording magnetic medium;

an auxiliary magnetic pole configured to form a magnetic circuit together with the main magnetic pole; and a spin torque oscillator formed between the main magnetic pole and the auxiliary magnetic pole, the spin torque oscillator including a first interface magnetic layer formed on one of the main magnetic pole and the auxiliary magnetic pole, and containing at least one element selected from the group consisting of iron, cobalt, and nickel, and at least one element selected from the group consisting of chromium, vanadium, manganese, titanium, and scandium, a first interlayer formed on the first interface magnetic layer, an oscillation layer formed on the first interlayer, and a cap layer formed on the oscillation layer.

* * * * *